(12) United States Patent
Cho et al.

(10) Patent No.: US 10,923,725 B2
(45) Date of Patent: Feb. 16, 2021

(54) METHOD FOR PRODUCING AN ANODE FOR A LITHIUM METAL SECONDARY BATTERY INCLUDING A MXENE THIN FILM

(71) Applicant: KOREA INSTITUTE OF SCIENCE AND TECHNOLOGY, Seoul (KR)

(72) Inventors: Won Il Cho, Seoul (KR); Mun Sek Kim, Seoul (KR); Ji Hyun Ryu, Seoul (KR); Seung Hun Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 92 days.

(21) Appl. No.: 16/285,680

(22) Filed: Feb. 26, 2019

(65) Prior Publication Data
US 2019/0267630 A1    Aug. 29, 2019

(30) Foreign Application Priority Data
Feb. 26, 2018  (KR) .................. 10-2018-0022925

(51) Int. Cl.
*H01M 4/04*  (2006.01)
*H01M 4/62*  (2006.01)
(Continued)

(52) U.S. Cl.
CPC ......... *H01M 4/628* (2013.01); *H01M 4/0402* (2013.01); *H01M 4/134* (2013.01);
(Continued)

(58) Field of Classification Search
USPC ................................... 427/58, 115
See application file for complete search history.

(56) References Cited

U.S. PATENT DOCUMENTS

2017/0088429 A1 *   3/2017  Shin .................. C01B 32/921
2017/0294546 A1 *  10/2017  Ghidiu ............... C01B 32/949
(Continued)

FOREIGN PATENT DOCUMENTS

| KR | 10-2014-0089450 A | 7/2014 |
| KR | 10-2014-0112597 A | 9/2014 |
| KR | 10-2018-0011207 A | 1/2018 |

OTHER PUBLICATIONS

Naguib et al. "MXene: a promising transition metal carbide anode for lithium-in batteries", 2012 Electrochemistry Communications, vol. 16 (n1), pp. 61-64 ISSN 1388-2481 (Year: 2012).*
(Continued)

*Primary Examiner* — Brian K Talbot
(74) *Attorney, Agent, or Firm* — Rabin & Berdo, P.C.

(57) ABSTRACT

A method for producing an anode for a lithium metal secondary battery includes coating a thin film comprised of $Nb_2C$, $Ti_2C$ or $Ti_3C_2$ on a substrate; providing a lithium metal electrode; and laminating the thin film to a surface of the lithium metal electrode. Coating is accomplished by providing a dispersion of a powder comprising $Nb_2C$, $Ti_2C$ or $Ti_3C_2$; and coating the dispersion on the substrate by Langmuir-Blodgett scooping (LBS). The method may further include, prior to providing the dispersion, obtaining the powder by etching a MAX phase structure represented by Formula 1, Formula 2 or Formula 3 below:

$$Nb_2AC \quad (1);$$

$$Ti_2AC \quad (2); \text{ and}$$

$$Ti_3AC_2 \quad (3),$$

where A is a metal selected from among Group IIIA elements, Group IVA elements, Cd, and combinations
(Continued)

thereof. The method may further include, after laminating the thin film, removing the substrate from the thin film.

11 Claims, 26 Drawing Sheets

(51) Int. Cl.

| | |
|---|---|
| H01M 10/052 | (2010.01) |
| H01M 4/36 | (2006.01) |
| H01M 4/1395 | (2010.01) |
| H01M 4/134 | (2010.01) |
| H01M 4/38 | (2006.01) |
| H01M 4/02 | (2006.01) |
| B05D 5/12 | (2006.01) |
| B05D 1/02 | (2006.01) |
| B05D 1/20 | (2006.01) |
| B05D 1/00 | (2006.01) |
| B05D 1/28 | (2006.01) |

(52) U.S. Cl.
CPC ......... *H01M 4/1395* (2013.01); *H01M 4/366* (2013.01); *H01M 4/382* (2013.01); *H01M 10/052* (2013.01); *B05D 1/005* (2013.01); *B05D 1/02* (2013.01); *B05D 1/202* (2013.01); *B05D 1/204* (2013.01); *B05D 1/283* (2013.01); *B05D 5/12* (2013.01); *H01M 2004/027* (2013.01)

(56) References Cited

U.S. PATENT DOCUMENTS

| | | | |
|---|---|---|---|
| 2018/0169591 A1* | 6/2018 | Mahmoud | C02F 1/44 |
| 2018/0233297 A1* | 8/2018 | Zhamu | H01G 11/84 |
| 2019/0352430 A1* | 11/2019 | Demirel | C07K 1/042 |
| 2019/0391099 A1* | 12/2019 | Jung | G01N 27/125 |

OTHER PUBLICATIONS

Alhabeb et al., Guidelines for synthesis and processing of two-dimensional Titanium Carbide (Ti3C2Tx MXene), Chemistry of Materials, Aug. 2017, pp. 7633-7644 (Year: 2017).*

M.S. Kim et al., "Fabricating multifunctional nanoparticle membrances by a fast layer-by-layer Langmuir-Blodgett process: application in lithium-sulfur batteries". Journal of Materials Chemistry A, 2016, pp. 14709-14719, vol. 4.

Xu Zhang et al., "MXene-based materials for electrochemical energy storage", Journal of Energy Chemistry, 2018, pp. 73-85, vol. 27.

Bin Li et al., "Flexible $Ti_3C_2$ MXene-lithium film with lamellar structure for ultrastable metallic lithium anodes", Nano Energy, Jul. 21, 2017, pp. 654-661, vol. 39.

\* cited by examiner

METHOD FOR PRODUCING AN ANODE FOR A LITHIUM METAL SECONDARY BATTERY INCLUDING A MXENE THIN FILM

CROSS-REFERENCE TO RELATED APPLICATIONS

This application claims priority under 35 U.S.C. § 119 to Korean Patent Application No. 10-2018-0022925 filed on Feb. 26, 2018 in the Korean Intellectual Property Office, the disclosure of which is incorporated herein by reference in its entirety.

BACKGROUND OF THE INVENTION

1. Field of the Invention

The present invention relates to an anode for a lithium metal secondary battery including a MXene thin film, a method for producing the anode, and a lithium metal secondary battery including the anode. More specifically, the present invention relates to an anode for a lithium metal secondary battery in which a MXene thin film is formed on a lithium metal electrode so that lithium ions are rapidly diffused and stably deposited to inhibit the formation of dendrites, and a lithium metal secondary battery using the anode in which side reactions between the lithium metal electrode and an electrolyte are prevented due to the presence of the MXene thin film, achieving good stability and high coulombic efficiency.

2. Description of the Related Art

The concept of lithium ion batteries (LiBs) was first established in 1962 and immediately lithium ion secondary batteries were proposed by M. S. Whittingham from Exxon, leading to the invention of Li—$TiS_2$ batteries. However, the company failed to commercialize battery systems including lithium metal and $TiS_2$ as an anode and a cathode, respectively, because the lithium metal (LiM) anode lacks in safety and the air/water sensitive $TiS_2$ cathode incurs a high production cost.

These problems were solved by using graphite capable of reversible intercalation and deintercalation of lithium as an anode and a lithium transition metal oxide (developed by J. O Besenhard) as a cathode, leading to the commercialization of current LiBs. The first commercial LiB was released by Sony and Asahi Kasei in 1991 and brought about a milestone in successful market expansion of portable electronic devices. Since then, the use of LiBs has increased exponentially and met the demand for electrical energy directly connected to consistent innovation of ordinary electronic devices such as cell phones, music players, speakers, drones, automobiles, and microsensors. Many researchers and scientists have investigated and studied new advanced energy materials, chemistry, and physics for stationary/mobile energy storage systems that meet the increasing demand for energy.

The recent development of commercially available LiBs has reached a saturation point. For example, only gradual improvements in the electrochemical performance of LiBs have been reported. Thus, along with the increasing demand for energy, research and development needs to be conducted on new energy materials with different morphologies and compositions. Under these circumstances, secondary batteries such as lithium-sulfur and lithium-air batteries including LiM anodes and conversion-type cathodes have received attention as next-generation batteries due to their high energy densities. Sulfur- and carbon-based air cathodes have theoretical energy densities of ~2,600 Wh/kg and ~11,400 Wh/kg, respectively, which are almost 10 times higher than that of LiBs (~360 Wh/kg for $C/LiCo_2O_4$). LiM as an anode material has a theoretical energy density as high as ~3,860 Wh/kg, a very low redox potential of −3.04 V vs. S.H.E, and a density of 0.59 g/$cm^3$. In contrast, graphite is an anode material that has a theoretical energy density as low as ~372 mAh/g and is rather high in redox potential and density. Thus, the use of a lithium anode instead of a graphite anode can contribute to a significant increase in energy density per weight of LiB. Upon successful commercialization of lithium-sulfur and lithium-air batteries in the future, LiM anodes and conversion-type cathodes are expected to meet the demand for high energy density.

Despite such advantages, several tough challenges should be addressed to commercialize batteries using LiM anodes. The most important challenge is to ensure reversible deposition and dissolution of lithium ions. High reactivity and non-uniform deposition of lithium cause many problems such as thermal runaway, electrolyte decomposition, and lithium loss. Non-uniform deposition of lithium ions during charge leads to the growth of dendrites that penetrate separators, resulting in short-circuit. This short-circuit generates much heat and sparks, causing serious safety problems giving rise to ignition of flammable electrolytes. Other problems of the LiM batteries are side reactions with electrolytes and unstable coulombic efficiency that cause the batteries to have low capacity and poor life characteristics. This instability is caused by continuous reactions between LiM and electrolytes to destroy and form SEIs during continuous charge/discharge cycle. Such undesired processes bring about continuous degradation of electrolytes, and as a result, electrochemically inactive species are formed in the batteries, deteriorating the performance of the batteries. Therefore, there is a need to provide stable deposition positions that form stable SEIs and protect the surface of active lithium for stable deposition and dissolution of lithium ions. In this scenario, the formation and growth of lithium dendrites can be effectively suppressed. For this purpose, there have been made many attempts. First, Cui and co-workers at Stanford University artificially synthesized an interconnected hollow carbon sphere film (200-300 nm thick) on the surface of lithium metal to isolate the LiM from an electrolyte. The electrochemically and mechanically stable artificial SEI layer, also called "hard-film", can suppress the formation of lithium dendrites. Further, Archer and co-workers at Cornell University proposed a dendrite-free lithium anode in which LiF-coated Li reduces the growth of lithium dendrites and forms a stable SEI. Many other effective chemical additives and flexible SEI films have been proposed. However, processes for producing protective films in an economical, easy, and effective manner still need to be developed to make LiM commercially available as an anode material.

The present inventor has found that lithium ions can be diffused and stably deposited to inhibit the formation of dendrites in an anode for a lithium metal secondary battery in which a MXene thin film is formed on a lithium metal electrode. The present inventor has also found that the presence of the MXene thin film prevents side reactions between the lithium metal electrode and an electrolyte in a lithium metal secondary battery using the anode, achieving good stability and high coulombic efficiency of the lithium metal secondary battery.

PRIOR ART DOCUMENTS

Patent Documents

Patent Document 1: Korean Patent Publication No. 10-2014-0112597
Patent Document 2: Korean Patent Publication No. 10-2014-0089450

SUMMARY OF THE INVENTION

The present invention has been made in view of the above problems, and it is an object of the present invention to provide an anode for a lithium metal secondary battery in which a MXene thin film is formed on a lithium metal electrode so that lithium ions are rapidly diffused and stably deposited to inhibit the formation of dendrites and a lithium metal secondary battery using the anode in which side reactions between the lithium metal electrode and an electrolyte are prevented due to the presence of the MXene thin film, achieving good stability and high coulombic efficiency.

One aspect of the present invention provides an anode for a lithium metal secondary battery, including: a lithium metal electrode including lithium metal or a lithium alloy; and a $Nb_2C$, $Ti_2C$ or $Ti_3C_2$ thin film formed on the lithium metal electrode.

A further aspect of the present invention provides a lithium metal secondary battery including the anode, an electrolyte, and a cathode.

Another aspect of the present invention provides an electric device including the anode wherein the electric device is selected from electric vehicles, hybrid electric vehicles, plug-in hybrid electric vehicles, and energy storage systems.

Yet another aspect of the present invention provides a method for producing an anode for a lithium metal secondary battery, including: (b) forming a $Nb_2C$, $Ti_2C$ or $Ti_3C_2$ thin film; and (c) transferring the $Nb_2C$, $Ti_2C$ or $Ti_3C_2$ thin film to the surface of a lithium metal electrode.

The formation of the MXene thin film on the lithium metal electrode in the anode of the present invention enables rapid diffusion and stable deposition of lithium ions to inhibit the formation of dendrites. In addition, the presence of the MXene thin film prevents side reactions between the lithium metal electrode and the electrolyte in the lithium metal secondary battery of the present invention, achieving good stability and high coulombic efficiency of the lithium metal secondary battery.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A shows the formation of an ultrathin film on water and the attachment of the ultrathin film to a solid, and FIG. 1B shows the transfer of the ultrathin film to lithium metal by rolling;

DETAILED DESCRIPTION OF THE INVENTION

Figure 1A:
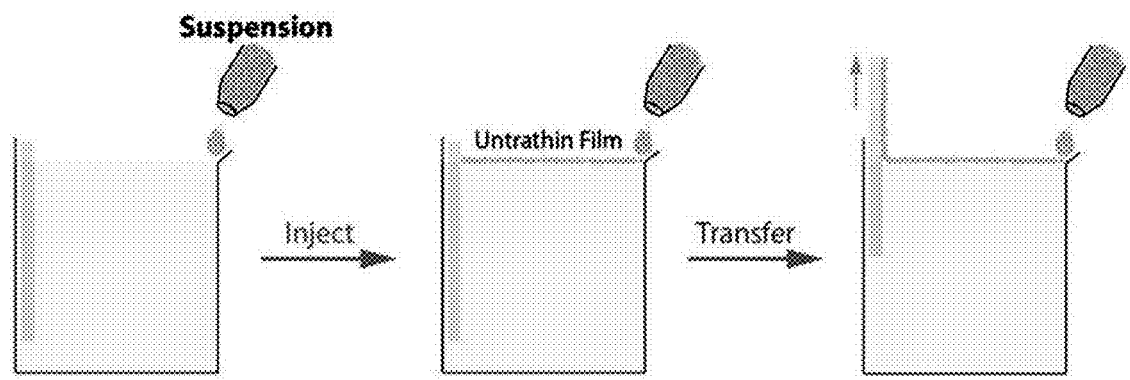
FIG. 1A is a schematic diagram showing formation of a $Nb_2C$, $Ti_2C$ or $Ti_3C_2$ thin film (artificial SEI film)
Figure 1B:
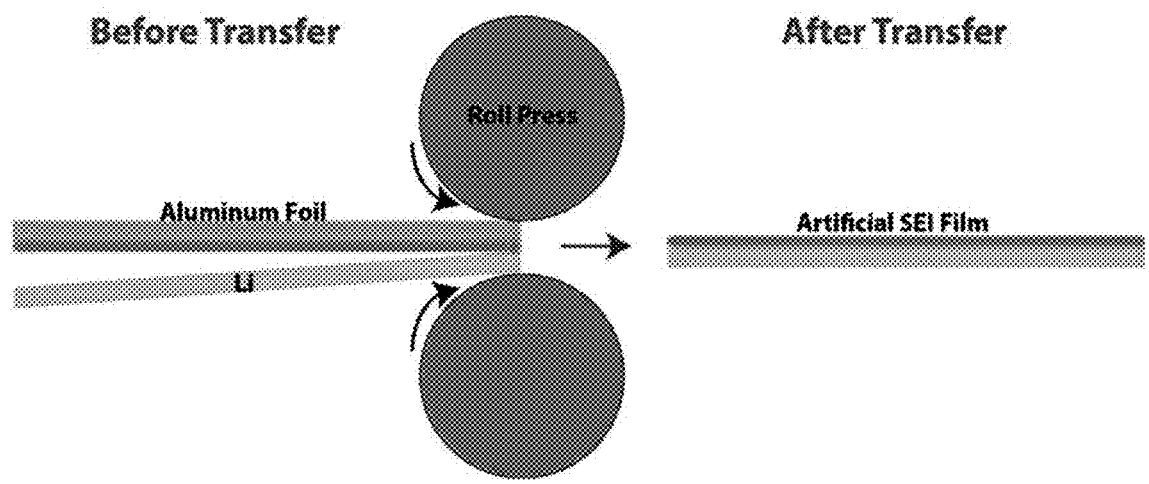
FIG. 1B shows transfer of the $Nb_2C$, $Ti_2C$ or $Ti_3C_2$ ultrathin film. Specifically.

Several aspects and various embodiments of the present invention will now be described in more detail.

One aspect of the present invention is directed to an anode for a lithium metal secondary battery, including: a lithium metal electrode including lithium metal or a lithium alloy; and a Nb$_2$C, Ti$_2$C or Ti$_3$C$_2$ thin film formed on the lithium metal electrode.

During electrochemical cycling of a lithium metal secondary battery, highly active and flexible lithium metal (LiM) tends to form dendrites when the battery is charged due to a local difference in current density on its rough surface. Once formed on the surface of the lithium metal, lithium dendrites penetrate a separator to cause an internal short circuit. This short circuit generates heat, causing the battery to explode. Particularly, high-density lithium metal secondary batteries have 10 times higher energy densities than other lithium ion batteries. Accordingly, one of the most crucial requirements for the commercialization of lithium metal secondary batteries is to develop technologies for improving battery safety while minimizing the danger of battery explosion. Further, repeated charge/discharge cycles lead to an increase in surface area, causing degradation of electrolytes. The continuous destruction and reformation of SEI layers brings about loss of lithium (i.e. low coulombic efficiency).

The present invention is aimed at solving the abovementioned problems. Specifically, a Nb$_2$C, Ti$_2$C or Ti$_3$C$_2$ thin film is formed on a lithium metal electrode to suppress the formation and diffusion of lithium dendrites such that the lithium metal electrode is stabilized and the occurrence of an internal short circuit is prevented. The Nb$_2$C, Ti$_2$C or Ti$_3$C$_2$ is a MXene material that exhibits a two-dimensional layered structure, is hydrophilic and electrically conductive, and has high mechanical strength, enabling smooth migration of lithium ions therethrough. Thus, the Nb$_2$C, Ti$_2$C or Ti$_3$C$_2$ facilitates plating/dissolution of lithium on the lithium metal electrode. The formation and diffusion of dendrites can be suppressed on the stabilized lithium metal electrode.

According to one embodiment of the present invention, the Nb$_2$C may show first, second, third, and fourth effective XPS peaks at binding energies ranging from 203 to 212 eV, from 282.5 to 287.5 eV, from 527.5 to 535 eV, and from 682.5 to 687.5 eV, respectively, as measured by XPS; the Ti$_2$C may show first, second, third, and fourth effective XPS peaks at binding energies ranging from 280 to 287.5 eV, from 457.5 to 462.5 eV, from 527.5 to 537.5 eV, and from 682.5 to 690 eV, respectively, as measured by XPS; and the Ti$_3$C$_2$ may show first, second, third, and fourth effective XPS peaks at binding energies ranging from 282.5 to 287.5 eV, from 450 to 460 eV, from 527.5 to 537.5 eV, and from 682.5 to 690 eV, respectively, as measured by XPS.

The results of XPS analysis reveal the binding of OH, O, and F as functional groups to the surface ends of the Nb$_2$C, Ti$_2$C or Ti$_3$C$_2$. Due to their interactions, these polar groups promote the concentration of lithium ions at the edges of the layered structure of the Nb$_2$C, Ti$_2$C or Ti$_3$C$_2$, that is, where surface energy is high. As a result, smooth migration of lithium ions is permitted, considerably improving the plating/dissolution of lithium.

According to a further embodiment of the present invention, the Nb$_2$C may show first, second, third, fourth, fifth, and sixth effective X-ray diffraction (XRD) peaks at 2θ angles ranging from 5 to 10°, from 10 to 15°, from 20 to 30°, from 30 to 40°, from 50 to 55°, and from 56 to 65°, respectively, as measured by XRD. The results of XRD analysis reveal that the dissolution of Al by hydrofluoric acid allows the Nb$_2$C to have a layered structure, causing shifts in the first, second, third, fourth, fifth, and sixth effective peaks.

In addition, the Ti$_2$C may show first, second, and third effective X-ray diffraction (XRD) peaks at 2θ angles ranging from 7 to 10°, from 23 to 28°, and from 48 to 50°, respectively, as measured by XRD. The results of XRD analysis reveal that the dissolution of Al by hydrofluoric acid allows the Ti$_2$C to have a layered structure, causing shifts in the first, second, and third effective peaks.

In addition, the Ti$_3$C$_2$ may show first, second, third, fourth, fifth, sixth, and seventh effective X-ray diffraction (XRD) peaks at 2θ angles ranging from 5 to 13°, from 15 to 20°, from 25 to 30°, from 31 to 45°, from 47 to 50°, from 51 to 55°, and from 56 to 70°, respectively, as measured by XRD. The results of XRD analysis reveal that the dissolution of Al by hydrofluoric acid allows the Ti$_3$C$_2$ to have a layered structure, causing shifts in the first, second, third, fourth, fifth, sixth, and seventh effective peaks.

Particularly, the XRD patterns of the Nb$_2$C, Ti$_2$C or Ti$_3$C$_2$ indicate a greatly improved diffusion rate of lithium ions.

A further aspect of the present invention is directed to a lithium metal secondary battery including the anode, an electrolyte, and a cathode.

According to one embodiment of the present invention, the cathode may include at least one compound selected from lithium cobalt oxides, lithium manganese oxides, lithium nickel cobalt aluminum oxides, lithium nickel manganese cobalt oxides, lithium iron phosphate oxide, and sulfur compounds or may be a porous air electrode. The cathode material is not limited but is preferably a lithium nickel manganese oxide.

Another aspect of the present invention is directed to an electric device including the anode wherein the electric device is selected from electric vehicles, hybrid electric vehicles, plug-in hybrid electric vehicles, and energy storage systems.

Yet another aspect of the present invention is directed to a method for producing an anode for a lithium metal secondary battery, including: (b) forming a Nb$_2$C, Ti$_2$C or Ti$_3$C$_2$ thin film; and (c) transferring the Nb$_2$C, Ti$_2$C or Ti$_3$C$_2$ thin film to the surface of a lithium metal electrode.

The formation of the layered Nb$_2$C, Ti$_2$C or Ti$_3$C$_2$ on the lithium metal electrode enables rapid diffusion of lithium ions to inhibit the formation and diffusion of dendrites on the lithium metal electrode. The layered Nb$_2$C, Ti$_2$C or Ti$_3$C$_2$ functions as an artificial SEI layer to effectively prevent side reactions between the lithium metal electrode and the electrolyte.

According to one embodiment of the present invention, in step (b), a dispersion of a Nb$_2$C, Ti$_2$C or Ti$_3$C$_2$ powder may be coated on a substrate to form a Nb$_2$C, Ti$_2$C or Ti$_3$C$_2$ thin film by a technique selected from Langmuir-Blodgett scooping (LBS), tape casting, vacuum filtration, electrospinning, spin coating, spray coating, and flat rolling. The technique for forming the Nb$_2$C, Ti$_2$C or Ti$_3$C$_2$ thin film is not limited but is preferably LBS.

Langmuir-Blodgett scooping (LBS) refers to a process for forming a thin film based on self-assembly of film-forming particles (Nb$_2$C, Ti$_2$C or Ti$_3$C$_2$ particles in the present invention), diffusion of a water-immiscible solvent (ethanol in the present invention), and the surface tension gradient known as the "Marangoni effect". When a suspension of film-forming particles in ethanol or isopropanol (IPA) as a suspension medium is injected into the surface of water, the suspension is rapidly diffused on the water surface while interacting with the water surface, lowering the surface tension of the water. As a result, the particles slip and self-assemble. This self-assembly leads to the formation of a uniform film on the water surface during injection of the suspension.

According to a further embodiment of the present invention, the method may further include (a) etching a MAX phase structure to obtain the Nb$_2$C, Ti$_2$C or Ti$_3$C$_2$ powder before step (b) wherein the MAX phase structure is represented by Formula 1, 2 or 3:

$$Nb_2AC \quad (1)$$

wherein A is a metal selected from Group IIIA elements, Group IVA elements, Cd, and combinations thereof;

$$Ti_2AC \quad (2)$$

wherein A is as defined in Formula 1;

$$Ti_3AC_2 \quad (3)$$

wherein A is as defined in Formula 1.

When the MAX phase structure of Formula 1, 2 or 3 is etched, the element A is removed to allow the Nb$_2$C, Ti$_2$C or Ti$_3$C$_2$ to have a two-dimensional layered structure.

According to another embodiment of the present invention, the MAX phase structure represented by Formula 1 may be Nb$_2$AlC and the etching may be performed by mixing the Nb$_2$AlC with hydrofluoric acid in such amounts that the weight ratio of the Nb$_2$AlC to hydrogen fluoride is 1:3.5-6.0, preferably 1:4.0-5.5, more preferably 1:4.5-5.0, and allowing the mixture to react for 2-9 days, preferably 3-8 days, more preferably 4-7 days.

Particularly, in the Examples section that follows, it was found that when the above conditions were met, the Nb$_2$C had the best layered structure.

The MAX phase structure represented by Formula 2 may be Ti$_2$AlC and the etching may be performed by mixing the Ti$_2$AlC with hydrofluoric acid in such amounts that the weight ratio of the Ti$_2$AlC to hydrogen fluoride is 1:0.5-1.5, preferably 1:0.7-1.3, more preferably 1:0.8-1.2, and allowing the mixture to react for 12-36 hours, preferably 18-30 hours, more preferably 22-26 hours.

Particularly, in the Examples section that follows, it was found that when the above conditions were met, the Ti$_2$C had the best layered structure.

The MAX phase structure represented by Formula 3 may be Ti$_3$AlC$_2$ and the etching may be performed by mixing the Ti$_3$AlC$_2$ with hydrofluoric acid in such amounts that the weight ratio of the Ti$_3$AlC$_2$ to hydrogen fluoride is 1:3.5-6.0, preferably 1:4.0-5.5, more preferably 1:4.5-5.0, and allowing the mixture to react for 2-5 days, preferably 2.5-4.5 days, more preferably 3-4 days.

Particularly, in the Examples section that follows, it was found that when the above conditions were met, the Ti$_3$C$_2$ had the best layered structure.

According to an alternative embodiment of the present invention, in step (b), one or more Nb$_2$C, Ti$_2$C or Ti$_3$C$_2$ thin films may be formed on a substrate by transferring a Nb$_2$C, Ti$_2$C or Ti$_3$C$_2$ thin film dispersed on the surface of a dispersion medium to the surface of the substrate, drying the thin film, and repeating the above procedure.

According to another embodiment of the present invention, in step (b), the Nb$_2$C, Ti$_2$C or Ti$_3$C$_2$ thin film may be transferred by immersing the substrate in the dispersion medium and lifting the substrate such that the thin film covers the substrate.

In step (b), a suspension of the material for the Nb$_2$C, Ti$_2$C or Ti$_3$C$_2$ thin film may be added to the dispersion while lifting the substrate.

According to another embodiment of the present invention, step (b) may be carried out when the Nb$_2$C, Ti$_2$C or Ti$_3$C$_2$ thin film accounts for 10% to 70% of the surface of the dispersion medium. If the Nb$_2$C, Ti$_2$C or Ti$_3$C$_2$ thin film accounts for less than 10% of the surface of the dispersion medium, it may not be sufficiently coated on the solid surface. Meanwhile, if the Nb$_2$C, Ti$_2$C or Ti$_3$C$_2$ thin film accounts for more than 70% of the surface of the dispersion medium, it may not be evenly formed.

According to another embodiment of the present invention, the suspension may have a concentration of 3 to 20% by weight.

According to another embodiment of the present invention, the suspension may be added such that the area of the Nb$_2$C, Ti$_2$C or Ti$_3$C$_2$ thin film on the surface of the dispersion medium is maintained at 10% to 70% of its initial value. If the area of the Nb$_2$C, Ti$_2$C or Ti$_3$C$_2$ thin film is maintained at less than 10% of its initial value, the Nb$_2$C, Ti$_2$C or Ti$_3$C$_2$ thin film may not be sufficiently coated on the solid surface. Meanwhile, if the area of the Nb$_2$C, Ti$_2$C or Ti$_3$C$_2$ thin film exceeds 70% of its initial value, the Nb$_2$C, Ti$_2$C or Ti$_3$C$_2$ thin film may not be evenly formed.

According to another embodiment of the present invention, the dispersion medium may be water and the suspension medium of the suspension may be ethanol. The dispersion medium is a polar or non-polar liquid. The use of water is particularly preferred in terms of safety and economic efficiency. Ethanol is particularly preferred as the suspension medium from the viewpoint of safety and economic efficiency.

According to an alternative embodiment of the present invention, in step (c), one or more Nb$_2$C, Ti$_2$C or Ti$_3$C$_2$ thin films formed on the substrate may be transferred to the surface of lithium metal.

According to another embodiment of the present invention, step (c) may be carried out by rolling.

According to another embodiment of the present invention, in step (c), the lithium metal and the substrate may be pressed against each other such that the lithium metal is close to the Nb$_2$C, Ti$_2$C or Ti$_3$C$_2$ thin film.

According to another embodiment of the present invention, the lithium metal and the substrate may be pressed against each other by sandwiching the lithium metal and the substrate close to each other between a pair of protective films and passing the sandwich structure through a rolling mill.

According to another embodiment of the present invention, roll cylinders of the rolling mill may be arranged at an interval corresponding to 50 to 90% of the total thickness of all layers inserted therebetween and the rolling speed of the rolling mill may be maintained at 0.05 to 0.2 cm/sec.

According to another embodiment of the present invention, step (c) may further include removing the substrate from the $Nb_2C$, $Ti_2C$ or $Ti_3C_2$ thin film-transferred lithium metal.

According to another embodiment of the present invention, step (c) may be carried out in a dry atmosphere at a relative humidity of 0% to 1%. If the relative humidity exceeds the upper limit defined above, the lithium metal may be oxidized, impairing the electrochemical properties of the anode.

According to another embodiment of the present invention, step (c) may be carried out in an atmosphere of at least one inert gas selected from argon, nitrogen, helium, and neon to prevent the oxidation and side reactions of the lithium metal.

According to another embodiment of the present invention, the substrate may be a copper foil and the protective films may be polyester films.

Particularly, although not explicitly described in the Examples section that follows, anodes for lithium metal secondary batteries were produced by varying the conditions defined in step (b), the concentration of the suspension, and the kinds of the dispersion medium and the suspension medium, lithium metal secondary batteries fabricated using the anodes were operated at high temperature for 500 hours, and then the cross-sections of the anodes were observed and losses of the $Nb_2C$, $Ti_2C$ or $Ti_3C_2$ thin films were investigated by scanning electron microscopy (SEM).

As a result, when the following conditions were met, no voids were formed at the interfaces between the lithium metal and the $Nb_2C$, $Ti_2C$ or $Ti_3C_2$ thin films and no losses of the $Nb_2C$, $Ti_2C$ or $Ti_3C_2$ thin films coated on the lithium metal were found even after the lithium metal secondary batteries were operated at high temperature for 500 hours, unlike when other conditions and other numerical ranges were employed: (i) step (b) was carried out when the $Nb_2C$, $Ti_2C$ or $Ti_3C_2$ thin film accounted for 10% to 70% of the surface of the dispersion medium; (ii) the suspension had a concentration of 5 to 10% by weight; (iii) the suspension was added such that the area of the $Nb_2C$, $Ti_2C$ or $Ti_3C_2$ thin film on the surface of the dispersion medium was maintained at 10% to 70% of its initial value; (iv) water was used as the dispersion medium; and (v) ethanol was used as the suspension medium.

When any one of the above conditions was not met, voids were formed in many portions of the interfaces between the lithium metal and the $Nb_2C$, $Ti_2C$ or $Ti_3C_2$ thin films and considerable losses of the $Nb_2C$, $Ti_2C$ or $Ti_3C_2$ thin films coated on the lithium metal electrodes were found after the lithium metal secondary batteries were operated at high temperature for 500 hours.

Although not explicitly described in the Examples section that follows, anodes for lithium metal secondary batteries were produced by varying the conditions defined in step (b), the concentration of the suspension, the kinds of the dispersion medium and the suspension medium, and the conditions defined in step (c), lithium metal secondary batteries fabricated using the anodes were operated at a high temperature of 800° C. or above, and the morphologies of the anodes were observed by scanning electron microscopy (SEM).

As a result, when the following conditions were met, no aggregation of the $Nb_2C$, $Ti_2C$ or $Ti_3C_2$ particles was observed in the $Nb_2C$, $Ti_2C$ or $Ti_3C_2$ thin films coated on the lithium metal even after the lithium metal secondary batteries were operated at high temperature for 800 hours, demonstrating excellent thermal stability of the secondary batteries, unlike when other conditions and other numerical ranges were employed: (i) step (b) was carried out when the $Nb_2C$, $Ti_2C$ or $Ti_3C_2$ thin film accounted for 10% to 70% of the surface of the dispersion medium; (ii) the suspension had a concentration of 5 to 10% by weight; (iii) the suspension was added such that the area of the $Nb_2C$, $Ti_2C$ or $Ti_3C_2$ thin film on the surface of the dispersion medium was maintained at 10% to 70% of its initial value; (iv) water was used as the dispersion medium; (v) ethanol was used as the suspension medium; (vi) step (c) was carried out by rolling; (vii) roll cylinders of the rolling mill were arranged at an interval corresponding to 50 to 90% of the total thickness of all layers inserted therebetween; (vii) the rolling speed of the rolling mill were maintained at 0.05 to 0.2 cm/sec; (ix) step (c) was carried out in a dry atmosphere at a relative humidity of 0% to 1%; (x) a copper foil was used as the substrate; and (xi) polyester films were used as the protective films.

When any one of the above conditions was not met, considerable aggregation of the $Nb_2C$, $Ti_2C$ or $Ti_3C_2$ particles was observed in the $Nb_2C$, $Ti_2C$ or $Ti_3C_2$ thin films coated on the lithium metal after the lithium metal secondary batteries were operated at high temperature for 800 hours.

The present invention will be explained in detail with reference with the following examples in conjunction with the accompanying drawings.

PREPARATIVE EXAMPLE 1-1

Preparation of $Nb_2C$ 10 g of commercial $Nb_2AlC$ was mixed with 10 ml of hydrofluoric acid (48% in $H_2O$). The reaction was allowed to proceed at room temperature for 1-7 days. When the $Nb_2AlC$ was etched for 4-7 days, $Nb_2C$ was optimally induced. The resulting $Nb_2C$ was washed 10 times with deionized water by centrifugation and dried in an oven at 80° C. to obtain a powder.

PREPARATIVE EXAMPLE 1-2

Preparation of $Ti_2C$ 10 g of commercial $Ti_2AlC$ was mixed with 10 ml of hydrofluoric acid (10% in $H_2O$). The reaction was allowed to proceed at room temperature for 1-7 days. When the $Ti_2AlC$ was etched for 1 day, $Ti_2C$ was optimally induced. The resulting $Ti_2C$ was washed 10 times with deionized water by centrifugation and dried in an oven at 80° C. to obtain a powder.

PREPARATION EXAMPLE 1-3

Preparation of $Ti_3C_2$ 10 g of commercial $Ti_3AlC_2$ was mixed with 10 ml of hydrofluoric acid (48% in $H_2O$). The reaction was allowed to proceed at room temperature for 1-7 days. When the $Ti_3AlC_2$ was etched for 3-4 days, $Ti_3C_2$ was optimally induced. The resulting $Ti_3C_2$ was washed 10 times with deionized water by centrifugation and dried in an oven at 80° C. to obtain a powder.

EXAMPLE 1-1

Production of Lithium Metal Electrode on which $Nb_2C$ Thin Film was Formed (1) Formation of $Nb_2C$ Thin Film The $Nb_2C$ particles (5-10 wt %) prepared in Preparative Example 1-1 were mixed with ethanol, followed by ultrasonic dispersion for 5 min. The resulting suspension was subjected to LBS coating to form a thin film of the $Nb_2C$ particles on a commercial copper foil as a substrate. Specifically, the suspension was added to water in which the substrate was immersed. When ~30% of the water surface was covered with a self-assembled film of the $Nb_2C$ particles, the substrate was slowly lifted such that the self-assembled film formed on the water surface was coated on the substrate. The suspension was continuously added at a constant rate such that the self-assembled film was maintained constant on the water surface. The coated substrate was dried for ~1 min on a hot plate maintained at 120° C. to remove water. This procedure was repeated 3-5 times.

(2) Transfer of the $Nb_2C$ Thin Film to Lithium Metal Electrode

The $Nb_2C$ thin film coated on the copper foil substrate was transferred to the surface of lithium metal using a rolling mill. Specifically, under dry environmental conditions, lithium metal and the $Nb_2C$ film were sandwiched between Mylar films (polyester films) and the sandwich structure was uniformly pressurized in a rolling mill. The interval between rolls of the rolling mill was adjusted to 0.1 mm (corresponding to 70% of the total thickness of all layers inserted between the rolls) and the rolling speed of the rolling mill was maintained at 0.1 cm/sec. Thereafter, the Mylar films were removed, the copper foil attached to the lithium metal was peeled off, and then the electrochemical properties of the $Nb_2C$ thin film-transferred lithium metal were measured. The entire procedure was carried out in a dry atmosphere at an RH of 0-1% and an inert gas atmosphere.

EXAMPLE 1-2

Production of Lithium Metal Electrode on which $Ti_2C$ Thin Film was Formed

A $Ti_2C$ thin film-transferred lithium metal electrode was produced in the same manner as in Example 1-1, except that the $Ti_2C$ particles prepared in Preparative Example 1-2 were used instead of the $Nb_2C$ particles prepared in Preparative Example 1-1. The electrochemical properties of the $Ti_2C$ thin film-transferred lithium metal were measured. The entire procedure was carried out in a dry atmosphere at an RH of 0-1% and an inert gas atmosphere.

EXAMPLE 1-3

Production of Lithium Metal Electrode on which $Ti_3C_2$ Thin Film was Formed

A $Ti_3C_2$ thin film-transferred lithium metal electrode was produced in the same manner as in Example 1-1, except that the $Ti_3C_2$ particles prepared in Preparative Example 1-3 were used instead of the $Nb_2C$ particles prepared in Preparative Example 1-1. The electrochemical properties of the $Ti_3C_2$ thin film-transferred lithium metal were measured. The entire procedure was carried out in a dry atmosphere at an RH of 0-1% and an inert gas atmosphere.

COMPARATIVE EXAMPLE 1

Pristine Lithium Metal Electrode

A pristine lithium metal electrode ("Pristine Li") without a $Nb_2C$ thin film was prepared.

Figure 2A:
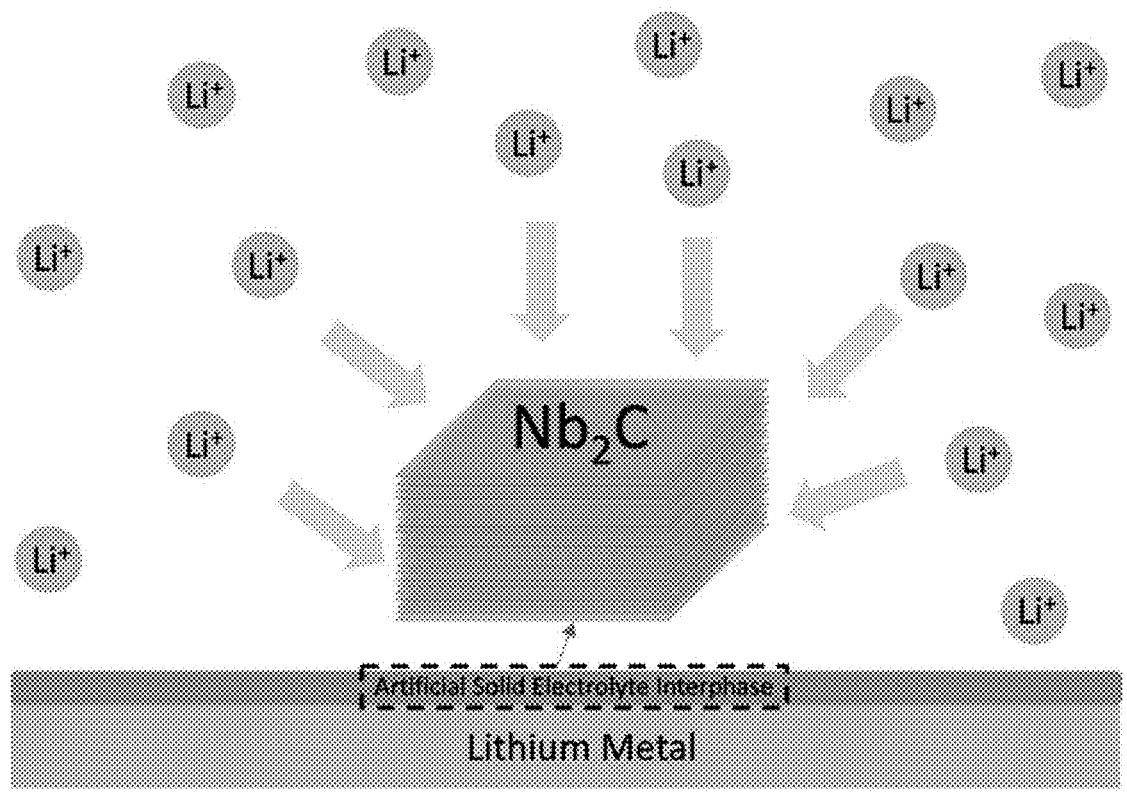
FIG. 2A is a schematic diagram of an anode produced in Example 1-1 in which a $Nb_2C$ thin film was formed on a lithium metal electrode.
Figure 2B:
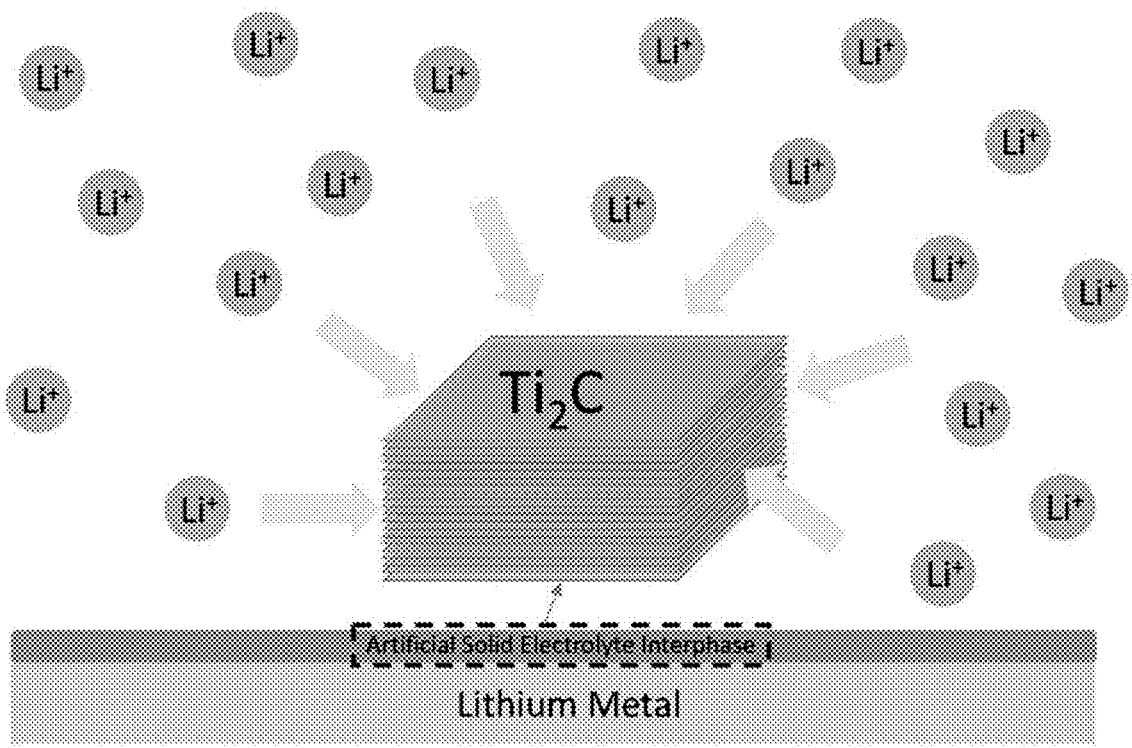
FIG. 2B is a schematic diagram of an anode produced in Example 1-2 in which a $Ti_2C$ thin film was formed on a lithium metal electrode.
Figure 2C:
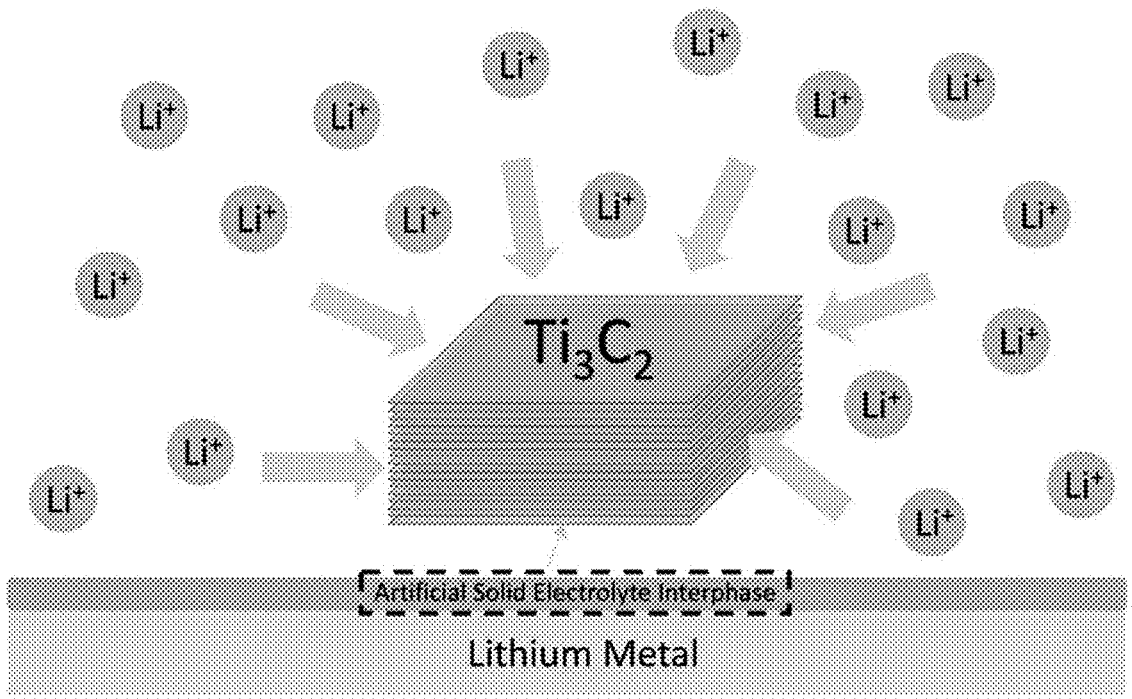
FIG. 2C is a schematic diagram of an anode produced in Example 1-3 in which a $Ti_3C_2$ thin film was formed on a lithium metal electrode.

FIGS. 2A, 2B, and 2C are schematic diagrams of the anodes produced in Example 1-1, 1-2, and 1-3 in which the $Nb_2C$, $Ti_2C$, and $Ti_3C_2$ thin films were formed on the lithium metal electrodes, respectively.

As shown in FIGS. 2A, 2B, and 2C, $Nb_2C$ induced from $Nb_2AlC$, $Ti_2C$ induced from $Ti_2AlC$, and $Ti_3C_2$ induced from $Ti_3AlC_2$ assist in the migration of lithium ions due to their high electrical conductivities and layered structures, which can enhance the electrochemical performance of lithium metal batteries.

Figure 3A:
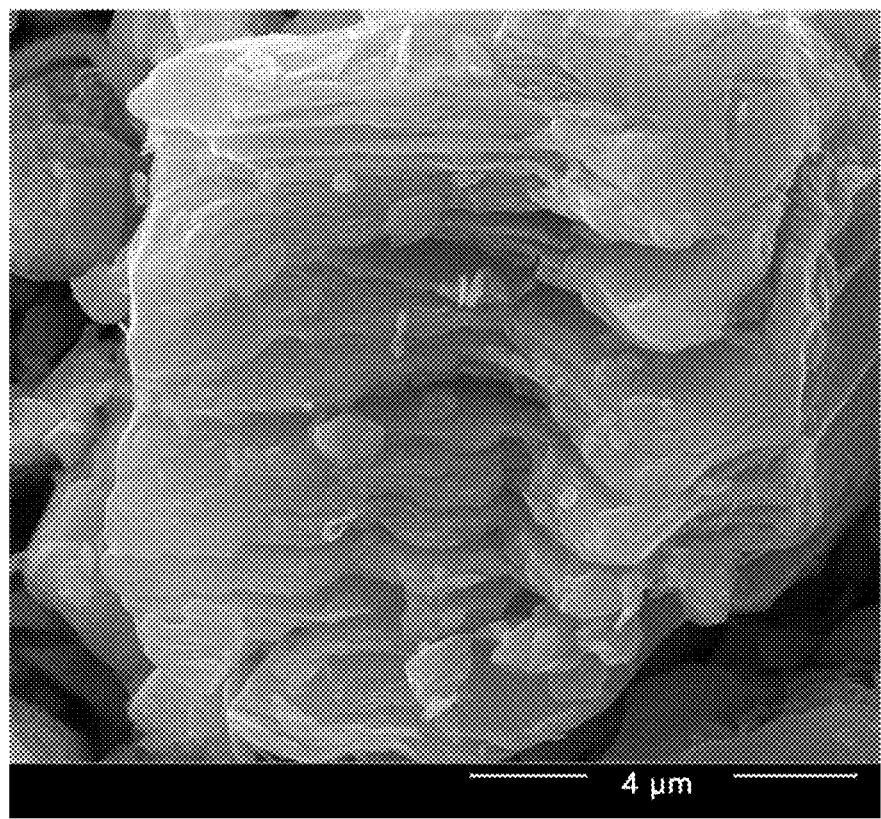
FIG. 3A is a scanning electron microscopy (SEM) image of $Nb_2C$ prepared in Preparative Example 1-1.
Figure 3B:
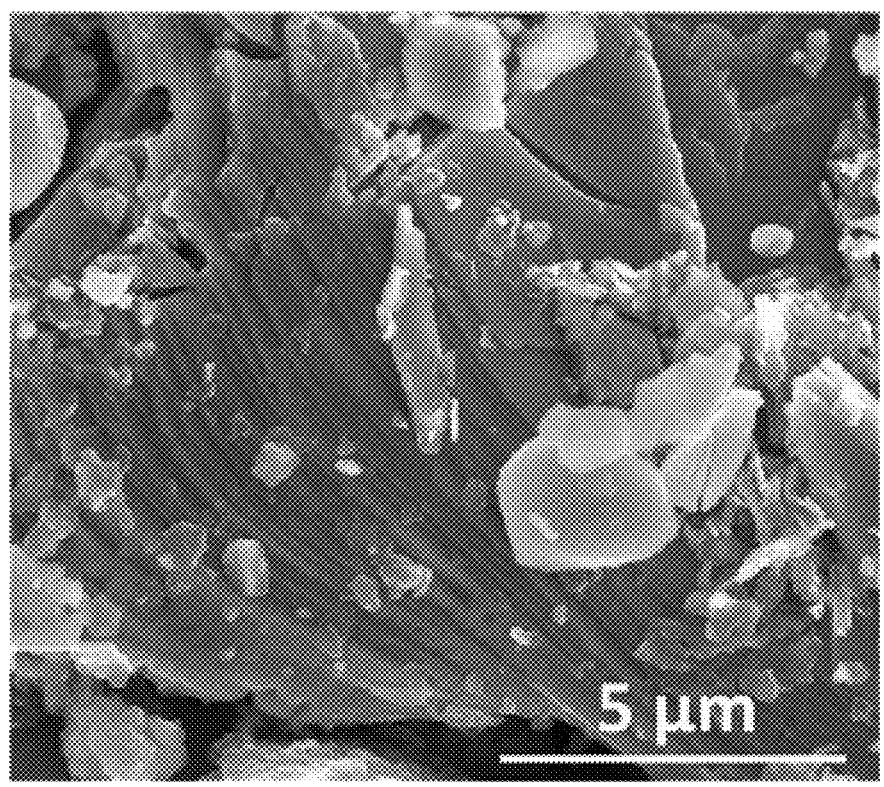
FIG. 3B is a scanning electron microscopy (SEM) image of $Ti_2C$ prepared in Preparative Example 1-2.
Figure 3C:
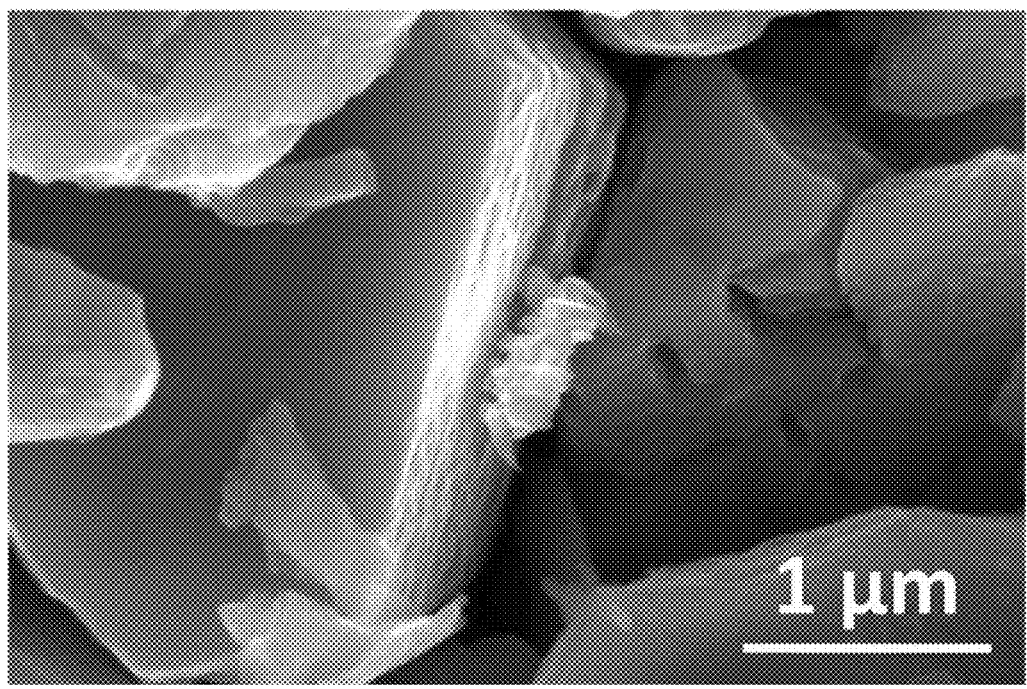
FIG. 3C is a scanning electron microscopy (SEM) image of $Ti_3C_2$ prepared in Preparative Example 1-3.

FIGS. 3A, 3B, and 3C are scanning electron microscopy (SEM) images of the $Nb_2C$, $Ti_2C$, and $Ti_3C_2$ prepared in Preparative Examples 1-1, 1-2, and 1-3, respectively.

Referring to FIGS. 3A, 3B, and 3C, $Nb_2C$ induced from $Nb_2AlC$, $Ti_2C$ induced from $Ti_2AlC$, and $Ti_3C_2$ induced from $Ti_3AlC_2$ had well-defined layered structures.

Figure 4A:
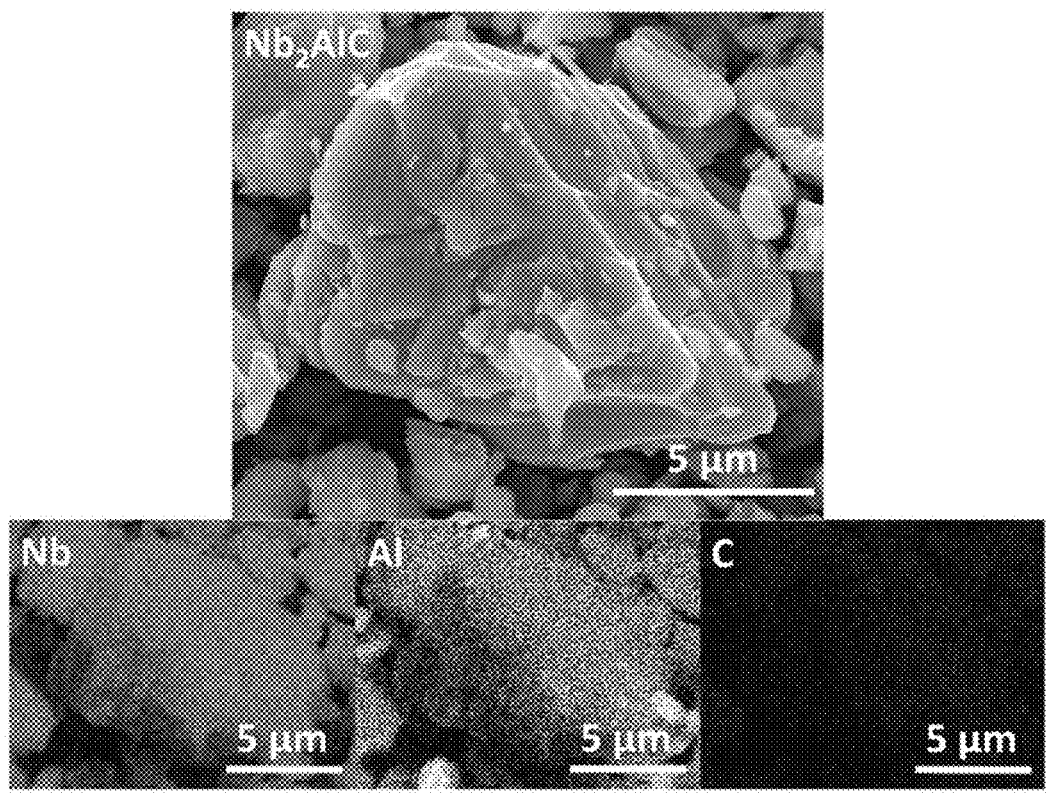
FIG. 4A shows a scanning electron microscopy (SEM) image and EDXS elemental mapping images of $Nb_2AlC$ used in Preparative Example 1-1.
Figure 4B:
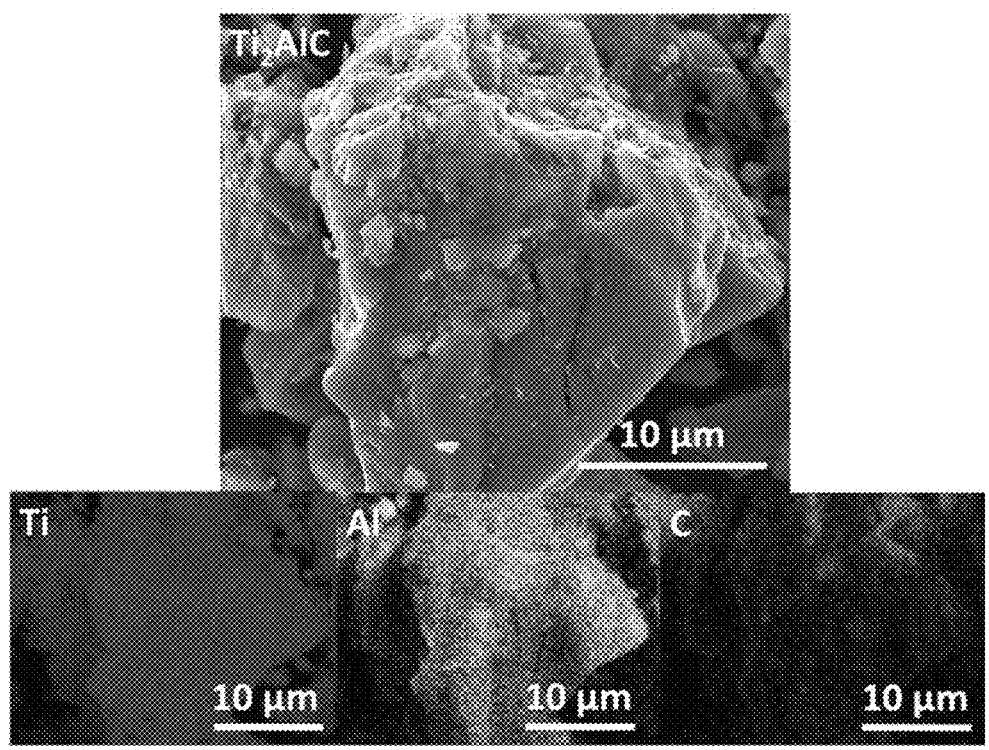
FIG. 4B shows a scanning electron microscopy (SEM) image and EDXS elemental mapping images of $Ti_2AlC$ used in Preparative Example 1-2.
Figure 4C:
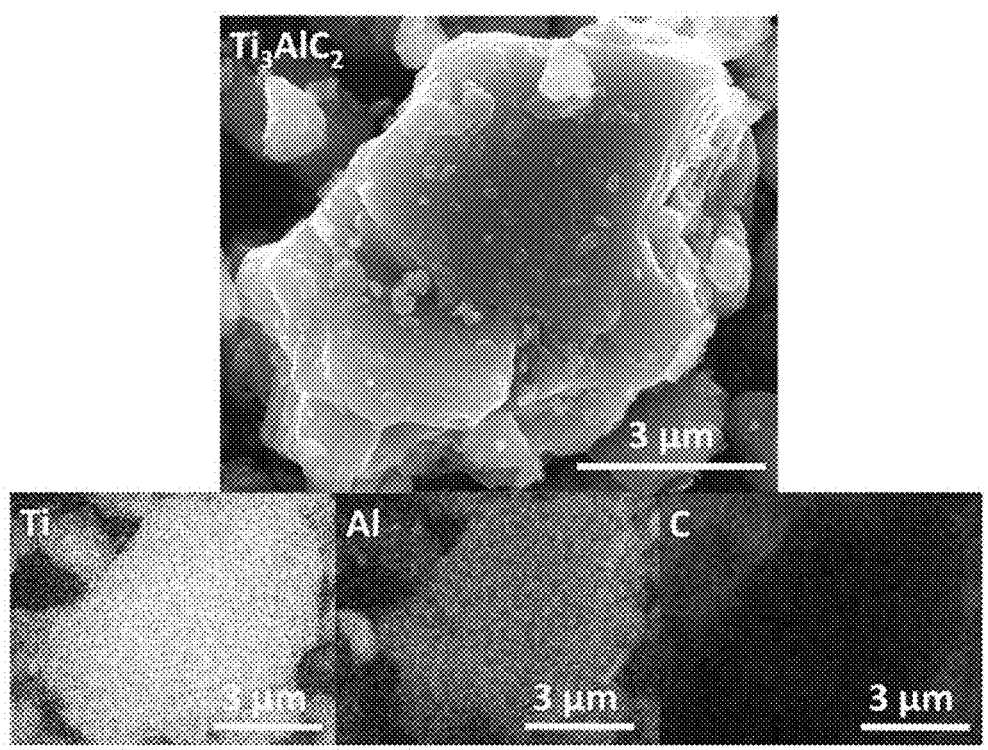
FIG. 4C shows a scanning electron microscopy (SEM) image and EDXS elemental mapping images of $Ti_3AlC_2$ used in Preparative Example 1-3.

FIGS. 4A, 4B, and 4C show scanning electron microscopy (SEM) images and EDXS elemental mapping images of $Nb_2AlC$, $Ti_2AlC$, and $Ti_3AlC_2$ used in Preparative Examples 1-1, 1-2, and 1-3, respectively.

The EDXS elemental mapping images shown in FIG. 4A reveal that the particles were essentially composed of Nb, Al, and C.

The EDXS elemental mapping images shown in FIGS. 4B and 4C reveal that the particles were essentially composed of Ti, Al, and C.

Figure 5A:
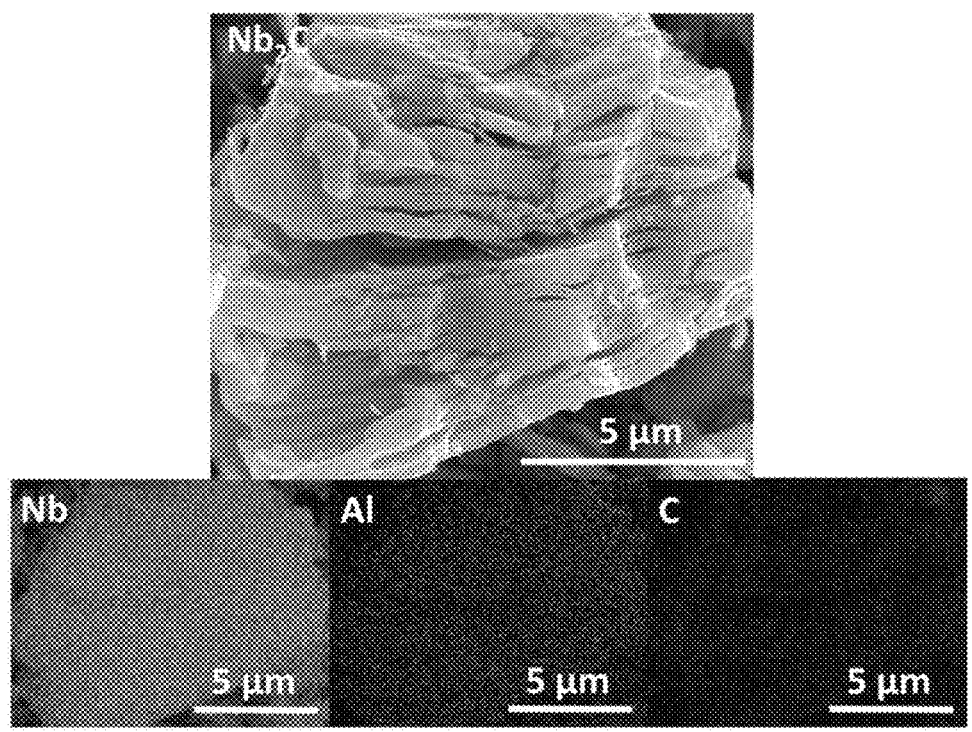
FIG. 5A shows a scanning electron microscopy (SEM) image and EDXS elemental mapping images of $Nb_2C$ particles prepared in Preparative Example 1-1.
Figure 5B:
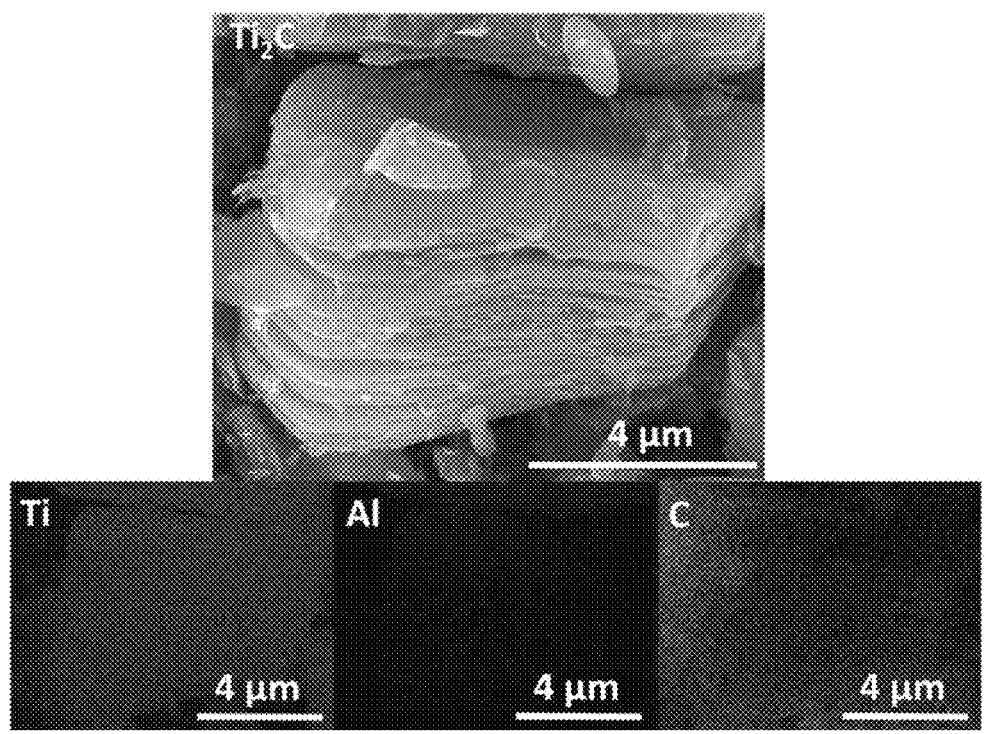
FIG. 5B shows a scanning electron microscopy (SEM) image and EDXS elemental mapping images of $Ti_2C$ particles prepared in Preparative Example 1-2.
Figure 5C:
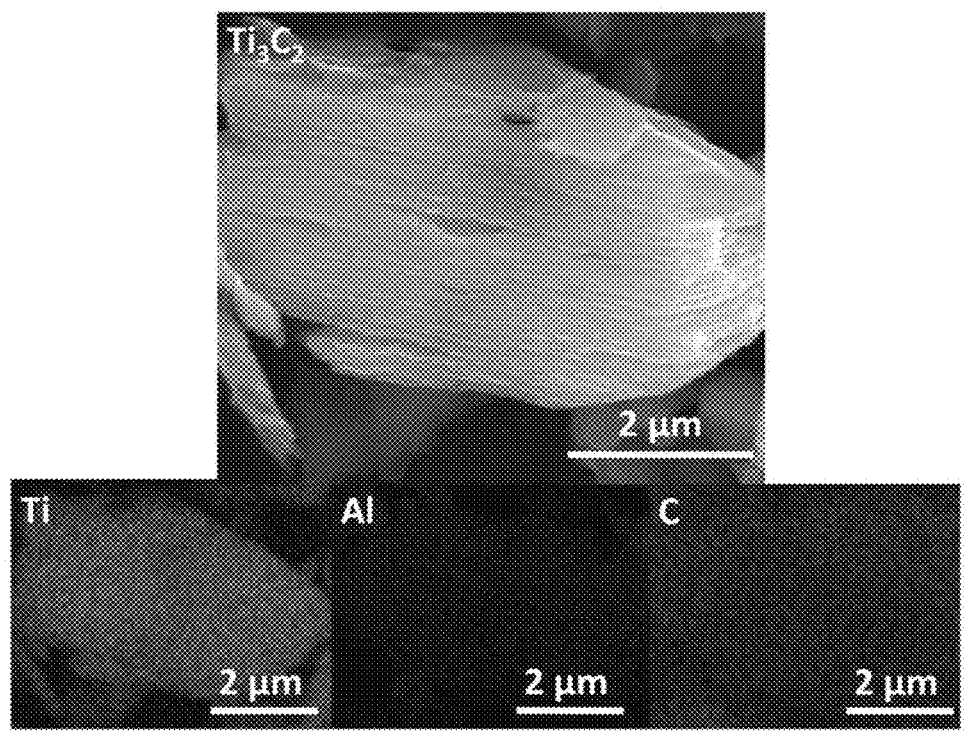
FIG. 5C shows a scanning electron microscopy (SEM) image and EDXS elemental mapping images of $Ti_3C_2$ particles prepared in Preparative Example 1-3.

FIGS. 5A, 5B, and 5C show scanning electron microscopy (SEM) images and EDXS elemental mapping images of the $Nb_2C$, $Ti_2C$, and $Ti_3C_2$ particles prepared in Preparative Examples 1-1, 1-2, and 1-3, respectively.

The elemental maps for Nb, Al, and C shown in FIG. 5A were compared with those shown in FIG. 4A, with the result that Al was dramatically reduced and substantially disappeared.

The elemental maps for Ti, Al, and C shown in FIGS. 5B and 5C were compared with those shown in FIGS. 4B and 4C, respectively, with the result that Al was dramatically reduced and substantially disappeared.

Figure 6A:
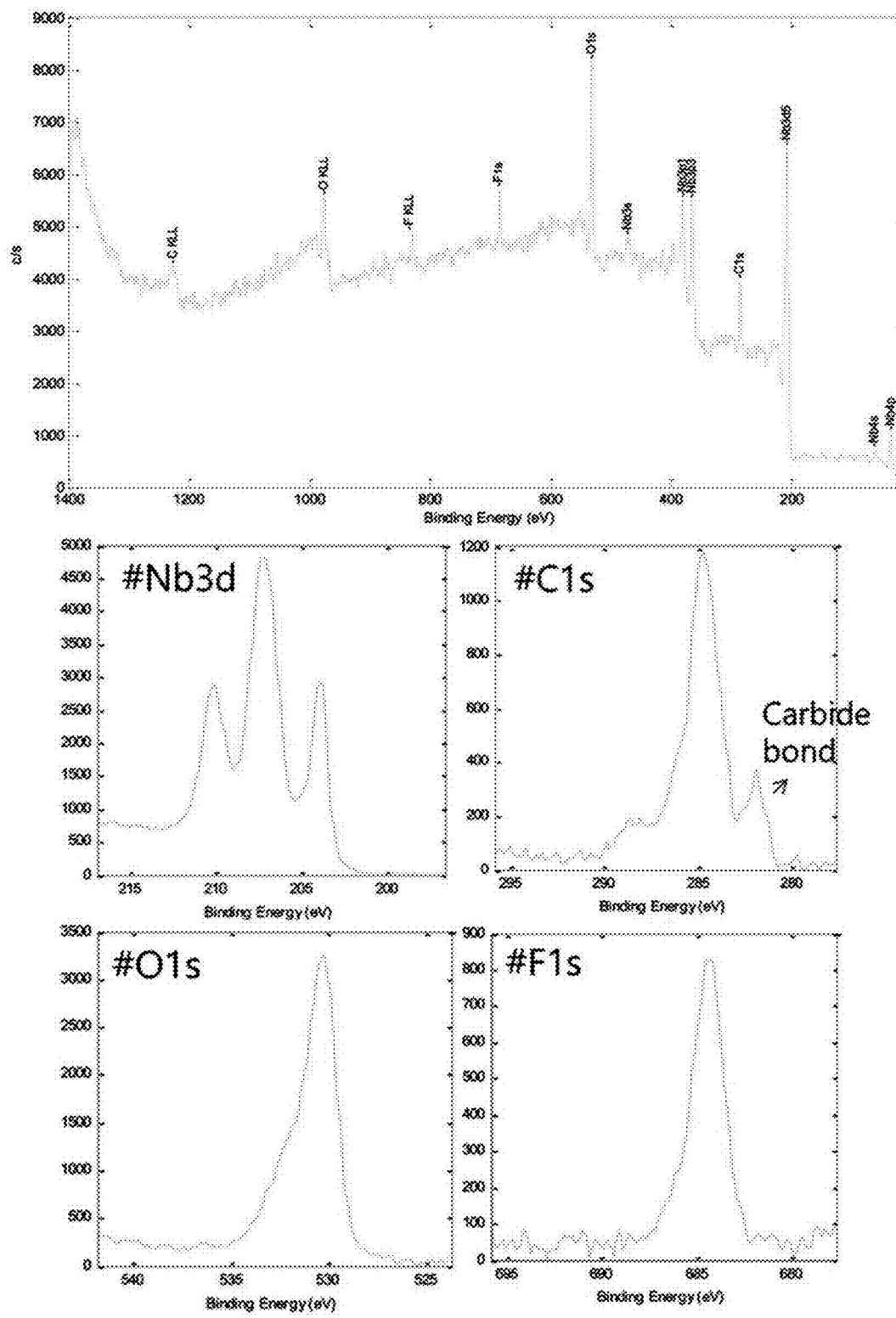
FIG. 6A is an X-ray photoelectron spectrum (XPS) of $Nb_2C$ prepared in Preparative Example 1-1.
Figure 6B:
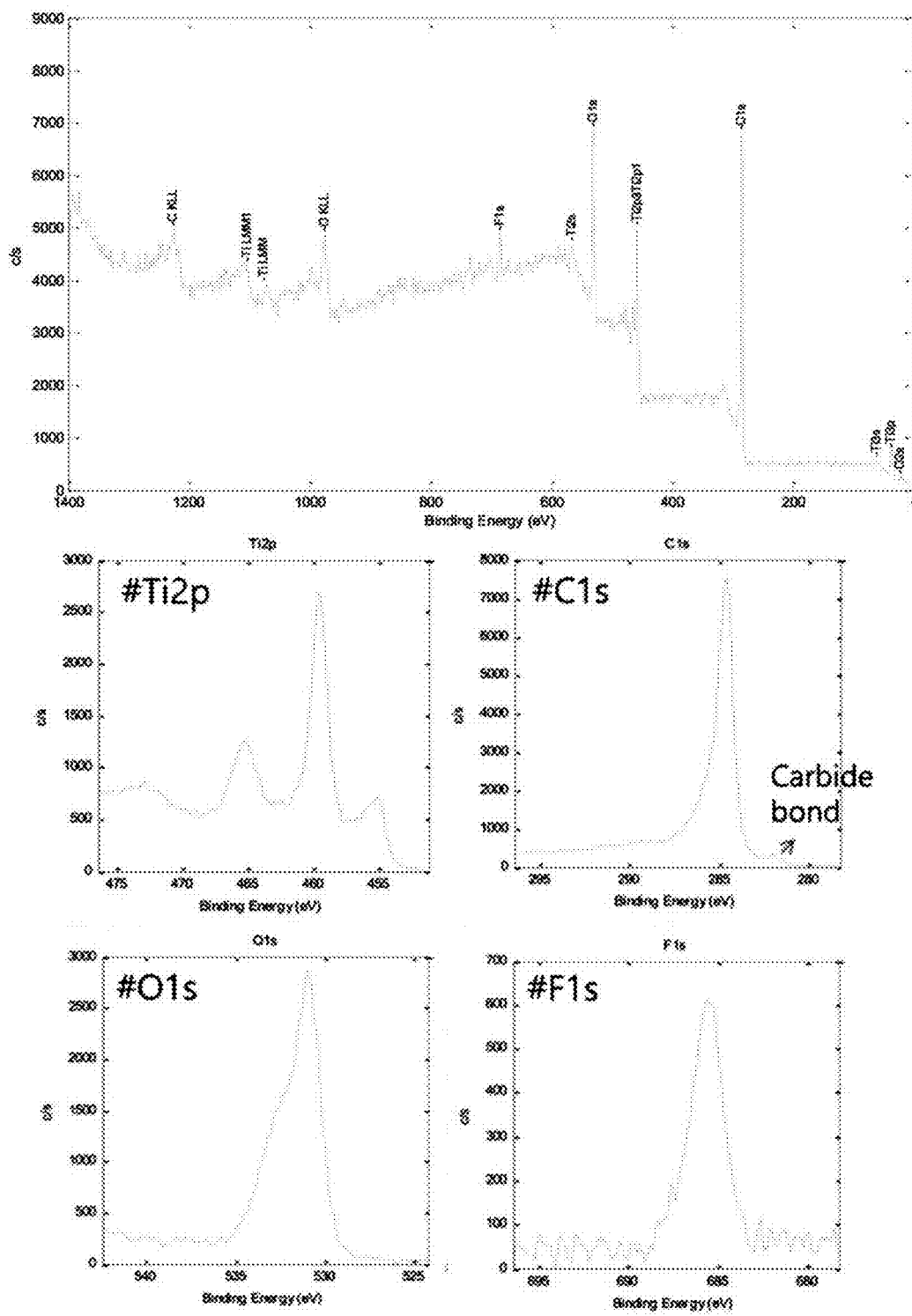
FIG. 6B is an X-ray photoelectron spectrum (XPS) of $Ti_2C$ prepared in Preparative Example 1-2.
Figure 6C:
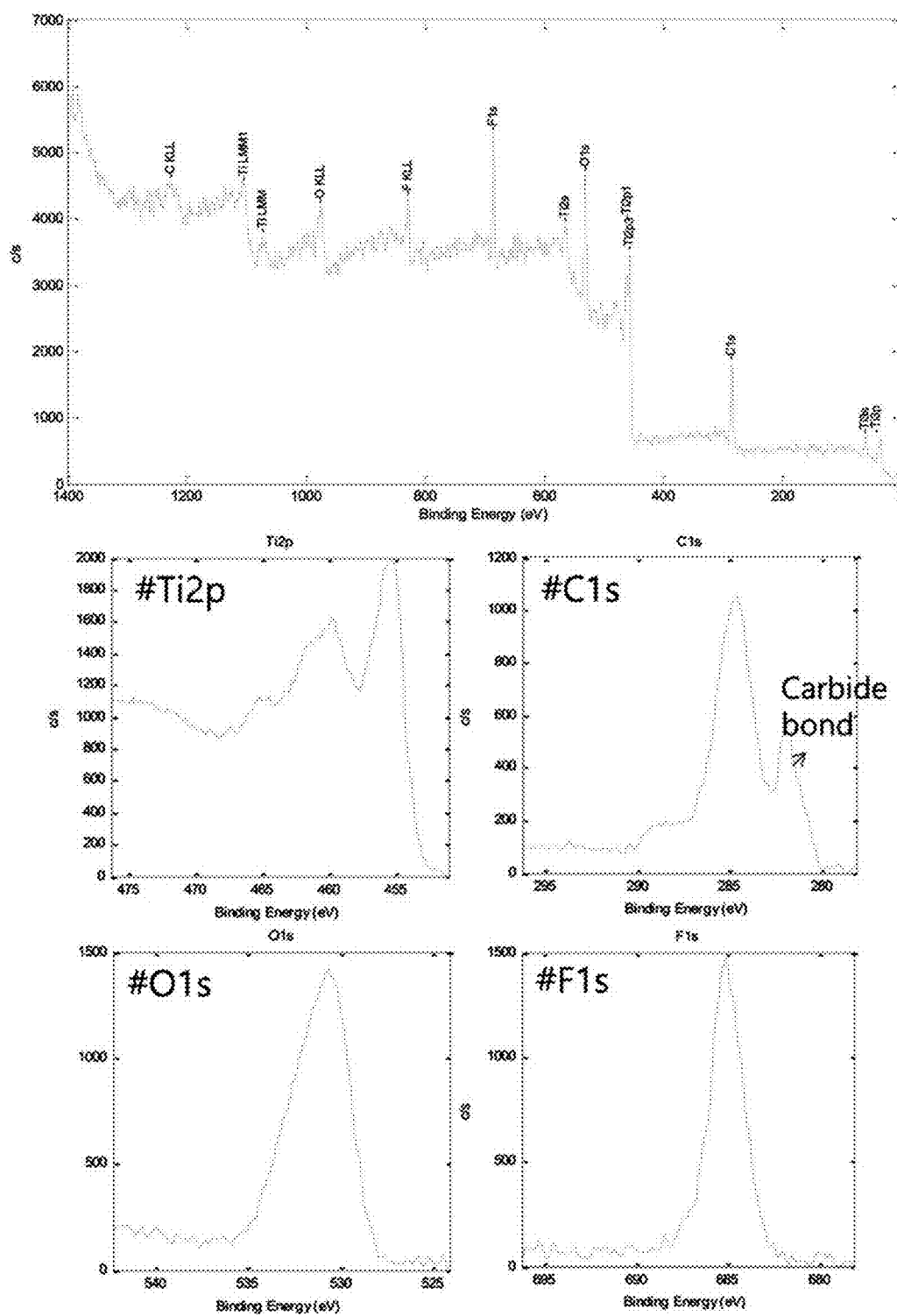
FIG. 6C is an X-ray photoelectron spectrum (XPS) of $Ti_3C_2$ prepared in Preparative Example 1-3.

FIGS. 6a, 6b, and 6c are X-ray photoelectron spectra (XPS) of the $Nb_2C$, $Ti_2C$, and $Ti_3C_2$ prepared in Preparative Examples 1-1, 1-2, and 1-3, respectively.

FIG. 6A shows binding energies for Nb and C in the $Nb_2C$, as clearly expected. FIG. 6A also shows the presence of O and F as surface terminal functional groups resulting from HF etching. The Al atoms were replaced by OH, O, and F during HF etching, which explains the formation of the surface terminal functional groups (Tx) of the $Nb_2C$. The $Nb_2C$ having the surface terminal functional groups can be represented by $Nb_2C(Tx)$. Due to their interactions, these polar groups further promote the concentration of lithium ions at the edges of the layered structure of the $Nb_2C$, that is, where surface energy is high. As a consequence, the functional groups assist in the migration and plating/dissolution of lithium ions.

FIG. 6B shows binding energies for Ti and C in the Ti$_2$C, as clearly expected. FIG. 6B also shows the presence of O and F as surface terminal functional groups resulting from HF etching. The Al atoms were replaced by OH, O, and F during HF etching, which explains the formation of the surface terminal functional groups (Tx) of the Ti$_2$C. The Ti$_2$C having the surface terminal functional groups can be represented by Ti$_2$C(Tx). Due to their interactions, these polar groups further promote the concentration of lithium ions at the edges of the layered structure of the Ti$_2$C, that is, where surface energy is high. As a consequence, the functional groups assist in the migration and plating/dissolution of lithium ions.

FIG. 6C shows binding energies for Ti and C in the Ti$_3$C$_2$, as clearly expected. FIG. 6C also shows the presence of O and F as surface terminal functional groups resulting from HF etching. The Al atoms were replaced by OH, O, and F during HF etching, which explains the formation of the surface terminal functional groups (Tx) of the Ti$_3$C$_2$. The Ti$_3$C$_2$ having the surface terminal functional groups can be represented by Ti$_3$C$_2$(Tx). Due to their interactions, these polar groups further promote the concentration of lithium ions at the edges of the layered structure of the Ti$_3$C$_2$, that is, where surface energy is high. As a consequence, the functional groups assist in the migration and plating/dissolution of lithium ions.

Figure 7A:
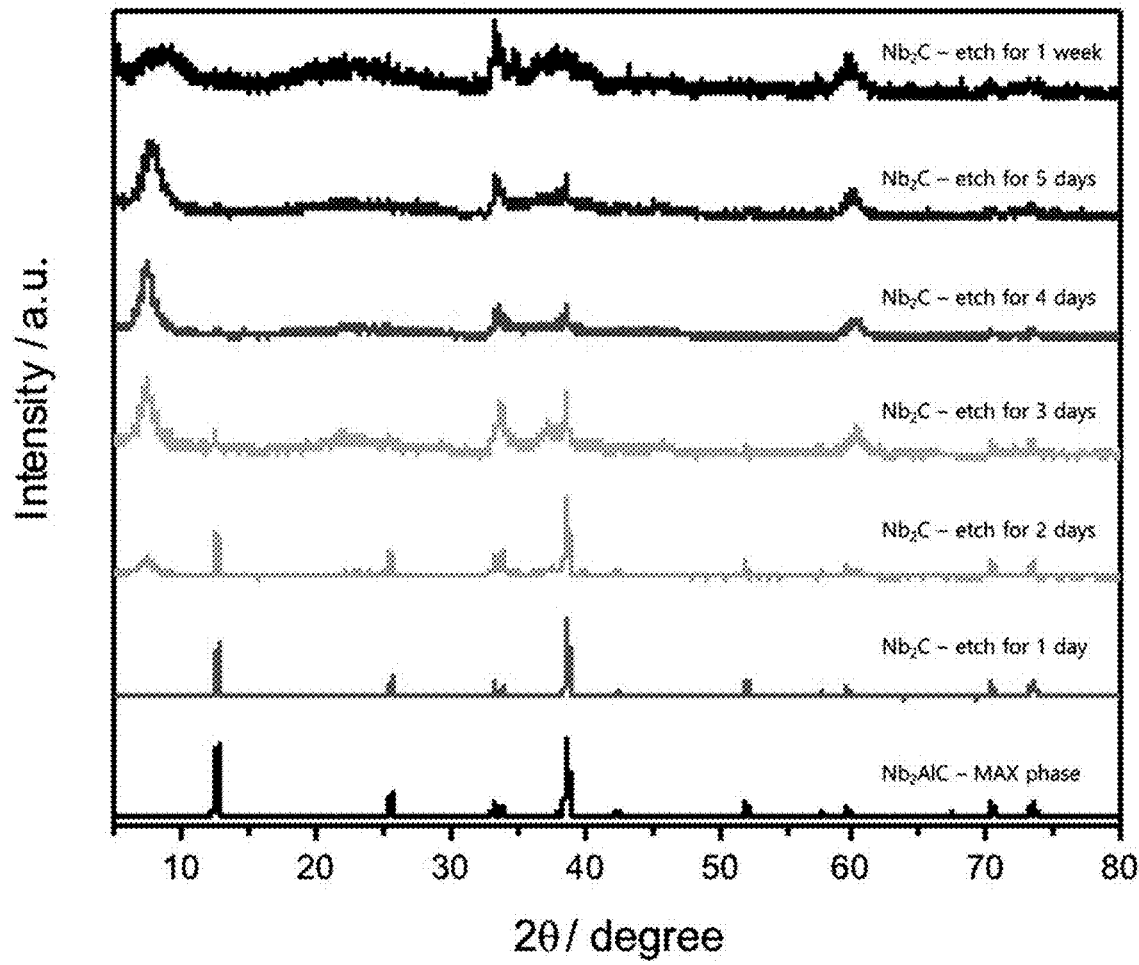
FIG. 7A shows X-ray diffraction (XRD) patterns of $Nb_2C$ products prepared by etching $Nb_2AlC$ with HF for different periods of time in Preparative Example 1-1.
Figure 7B:
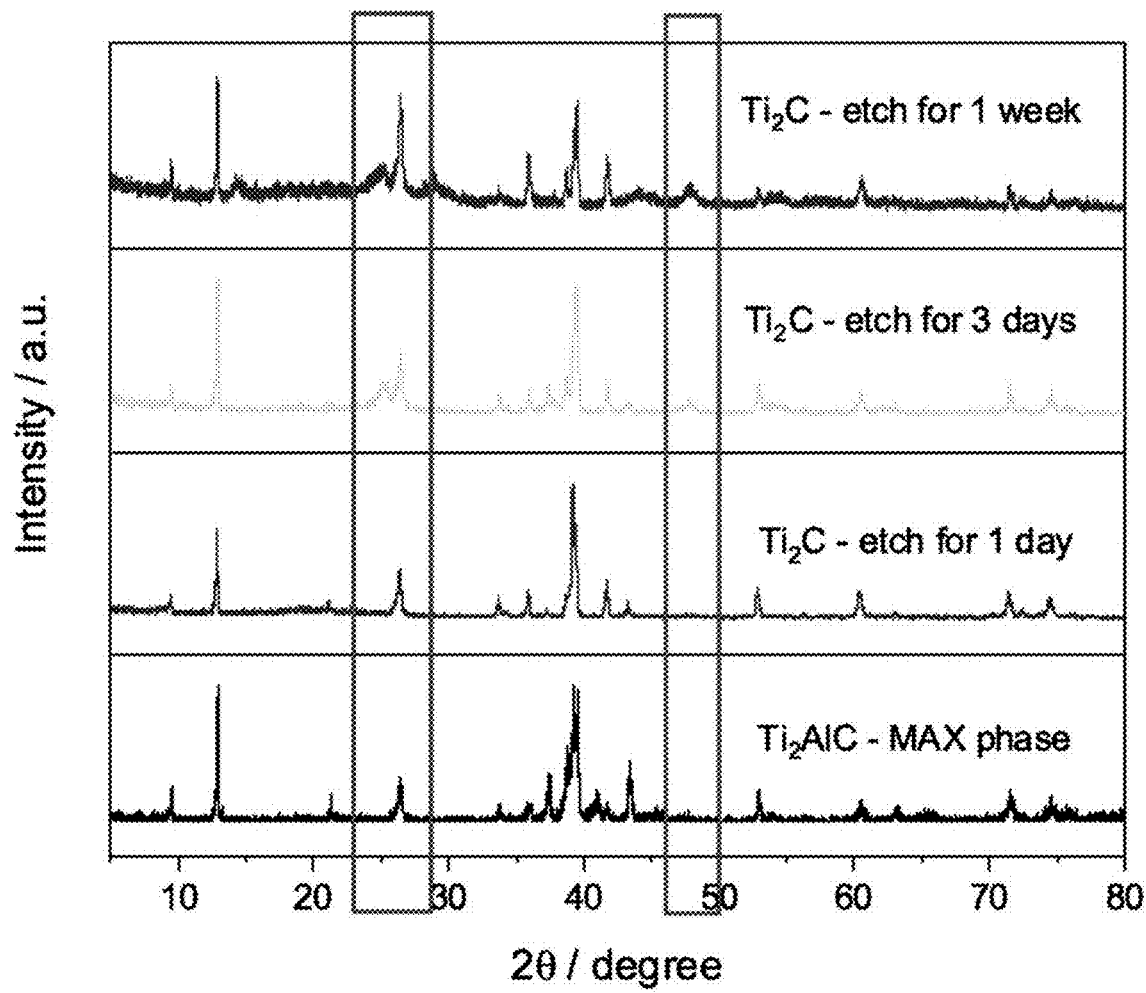
FIG. 7B shows X-ray diffraction (XRD) patterns of $Nb_2C$ products prepared by etching $Ti_2AlC$ with HF for different periods of time in Preparative Example 1-2.
Figure 7C:
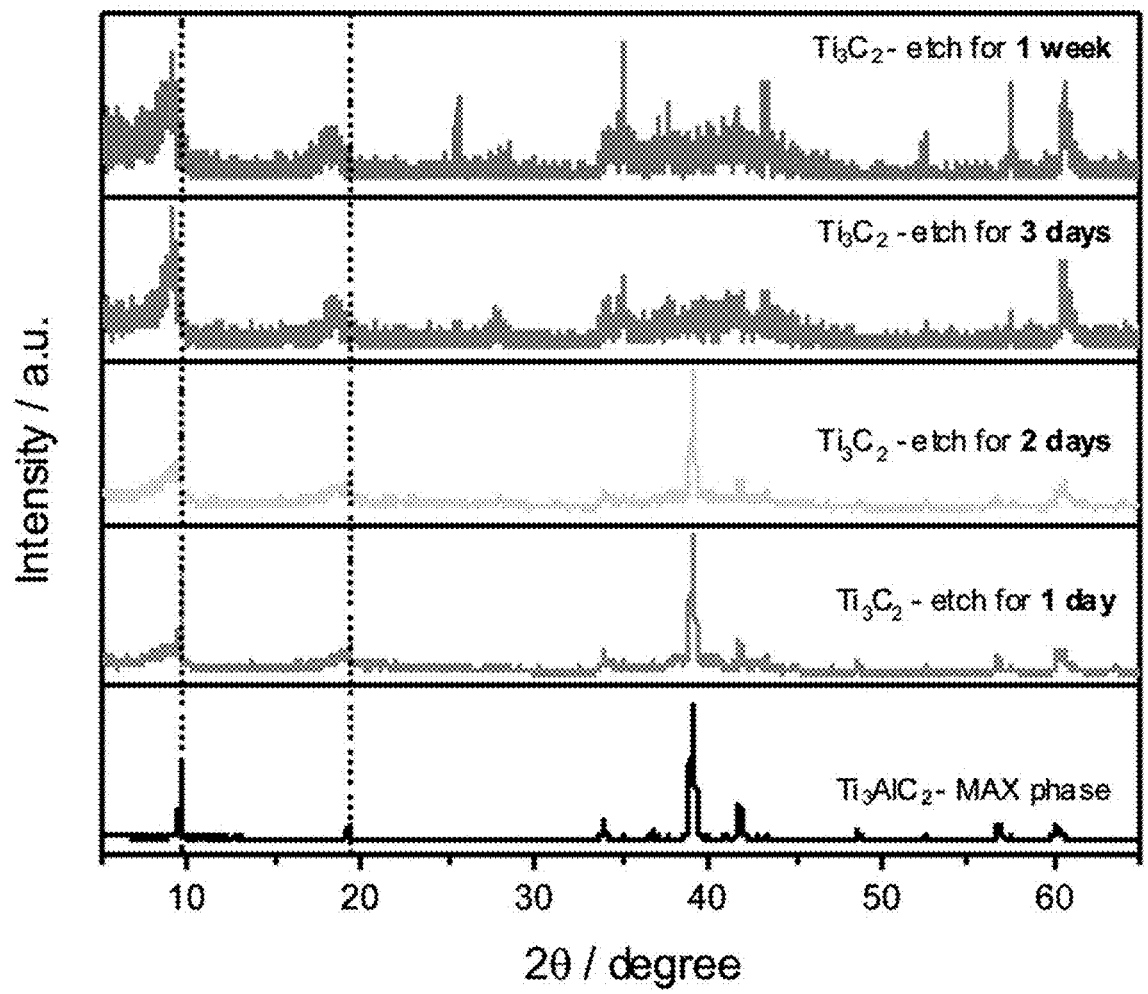
FIG. 7C shows X-ray diffraction (XRD) patterns of $Nb_2C$ products prepared by etching $Ti_3AlC_2$ with HF for different periods of time in Preparative Example 1-3.

FIGS. 7A, 7B, and 7C show X-ray diffraction (XRD) patterns of the Nb$_2$C, Ti$_2$C, and Ti$_3$C$_2$ products prepared by etching Nb$_2$AlC, Ti$_2$AlC, and Ti$_3$AlC$_2$ with HF for different periods of time in Preparative Examples 1-1, 1-2, and 1-3, respectively.

Referring to FIG. 7A, the etching time dependent peak shifts and variations indicate the characteristics of layered structures arising from the dissolution of Al in hydrofluoric acid. The Nb$_2$C particles obtained after 3 days under the etching conditions defined in the present invention had layered structures.

Referring to FIGS. 7B and 7C, the etching time dependent peak shifts and variations indicate the characteristics of layered structures arising from the dissolution of Al in hydrofluoric acid. The Ti$_2$C and Ti$_3$C$_2$ particles obtained after 1 day under the etching conditions defined in the present invention had layered structures.

Figure 8A:
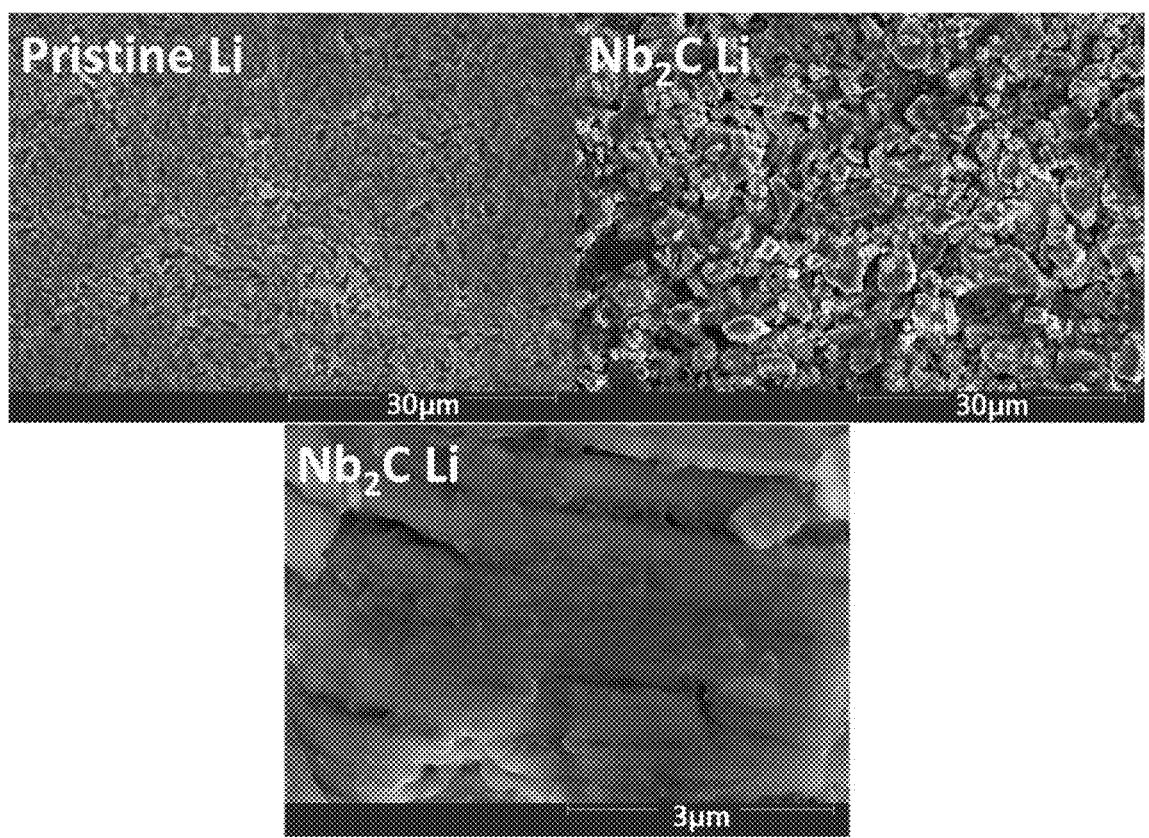
FIG. 8A shows surface scanning electron microscopy (SEM) images of a pristine lithium metal electrode ("Pristine Li" of Comparative Example 1) and a lithium metal electrode on which a $Nb_2C$ thin film was formed ("$Nb_2C$ Li" of Example 1-1) after repeated charge/discharge cycles. The rightmost image is an enlargement of the middle image.
Figure 8B:
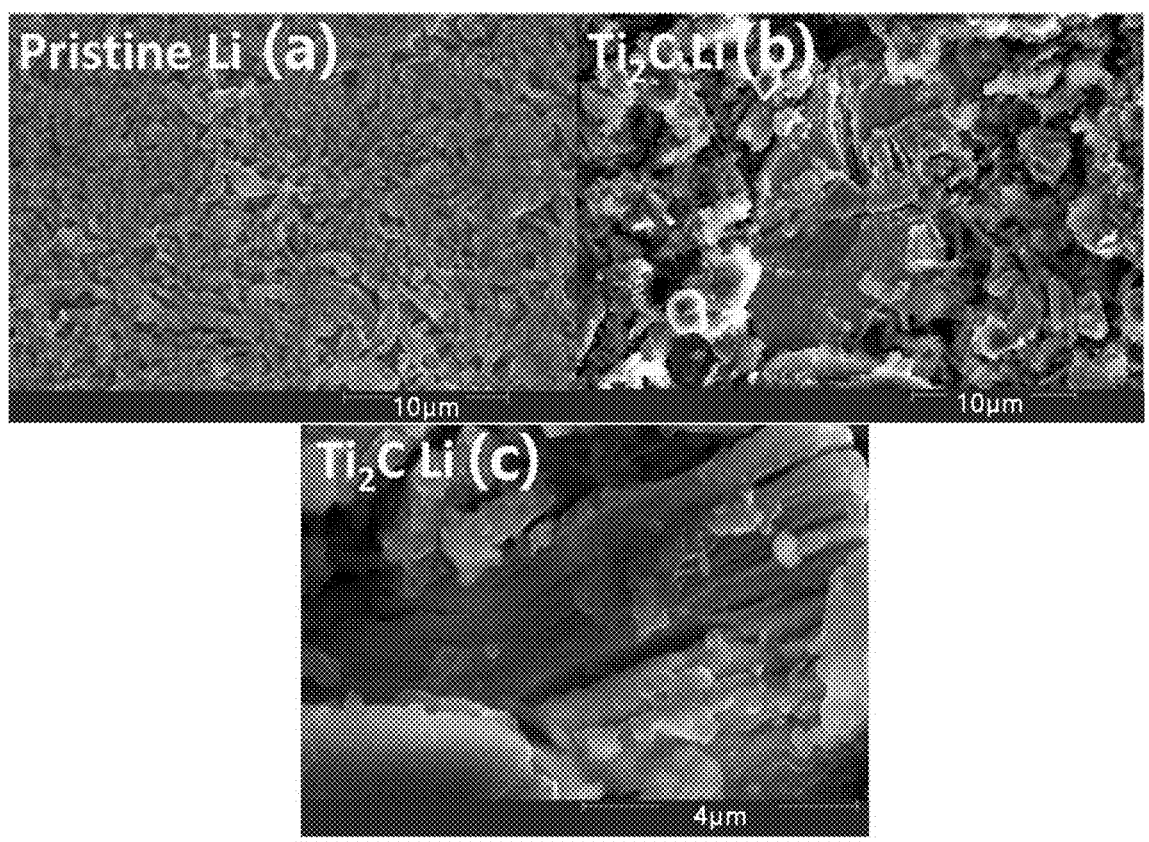
FIG. 8B shows surface scanning electron microscopy (SEM) images of (a) a pristine lithium metal electrode ("Pristine Li" of Comparative Example 1) and (b) a lithium metal electrode on which a $Ti_2C$ thin film was formed ("$Ti_2C$ Li" of Example 1-2) after repeated charge/discharge cycles. The rightmost image (c) is an enlargement of the middle image (b)
Figure 8C:
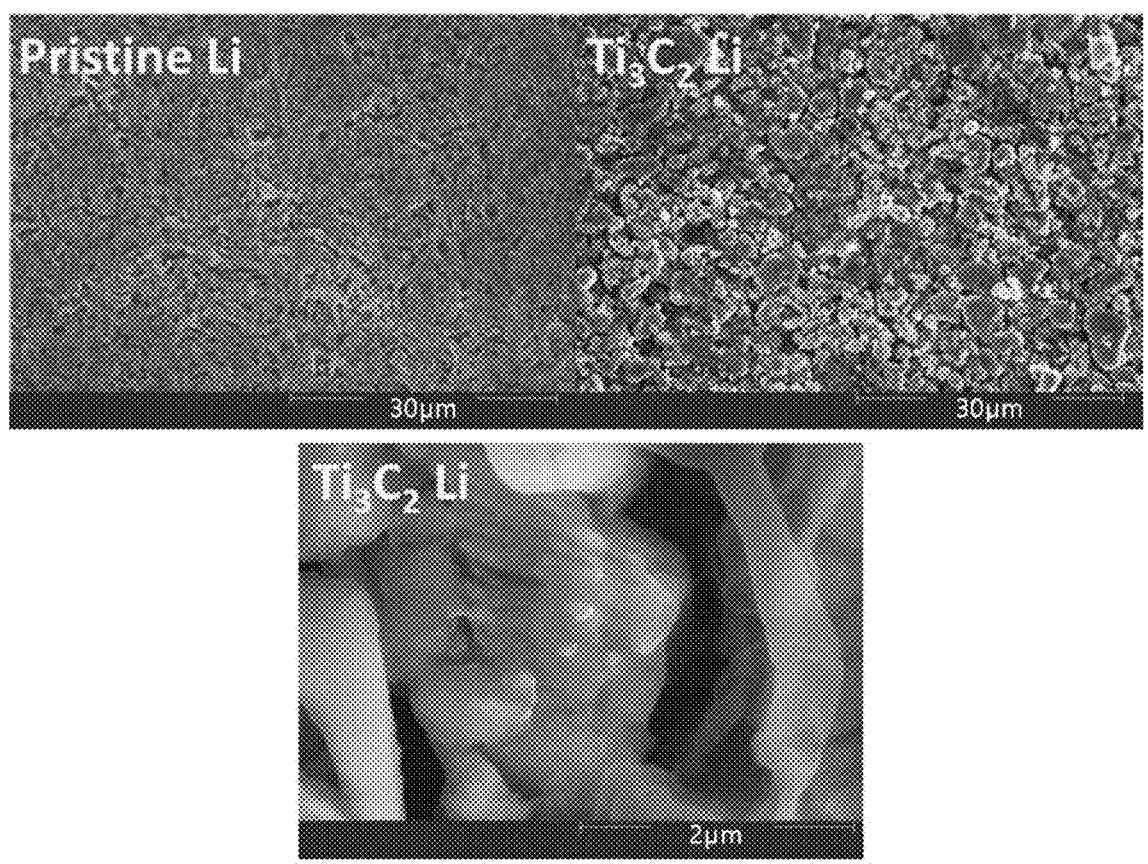
FIG. 8C shows surface scanning electron microscopy (SEM) images of a pristine lithium metal electrode ("Pristine Li" of Comparative Example 1) and a lithium metal electrode on which a $Ti_3C_2$ thin film was formed ("$Ti_3C_2$ Li" of Example 1-3) after repeated charge/discharge cycles. The rightmost image is an enlargement of the middle image.

FIG. 8A shows surface scanning electron microscopy (SEM) images of the pristine lithium metal electrode ("Pristine Li" of Preparative Example 1) and the lithium metal electrode on which the Nb$_2$C thin film was formed ("Nb$_2$C Li" of Example 1-1) after repeated charge/discharge cycles. The rightmost image of FIG. 8 is an enlargement of the middle image. FIG. 8B shows surface scanning electron microscopy (SEM) images of the pristine lithium metal electrode ("Pristine Li" of Comparative Example 1) (a) and the lithium metal electrode on which the Ti$_2$C thin film was formed ("Ti$_2$C Li" of Example 1-2) (b) after repeated charge/discharge cycles. The rightmost image (c) is an enlargement of the middle image (b). FIG. 8C shows surface scanning electron microscopy (SEM) images of the pristine lithium metal electrode ("Pristine Li" of Comparative Example 1) and the lithium metal electrode on which the Ti$_3$C$_2$ thin film was formed ("Ti$_3$C$_2$ Li" of Example 1-3) after repeated charge/discharge cycles. The rightmost image is an enlargement of the middle image.

Referring to FIGS. 8a, 8b, and 8c, a number of lithium dendrites were formed in Pristine Li, as expected, but the formation of lithium dendrites was clearly suppressed in the lithium metal electrode on which the Nb$_2$C, Ti$_2$C or Ti$_3$C$_2$ thin film was formed. The rightmost image shows the formation of a uniform SEI.

Figure 9A:
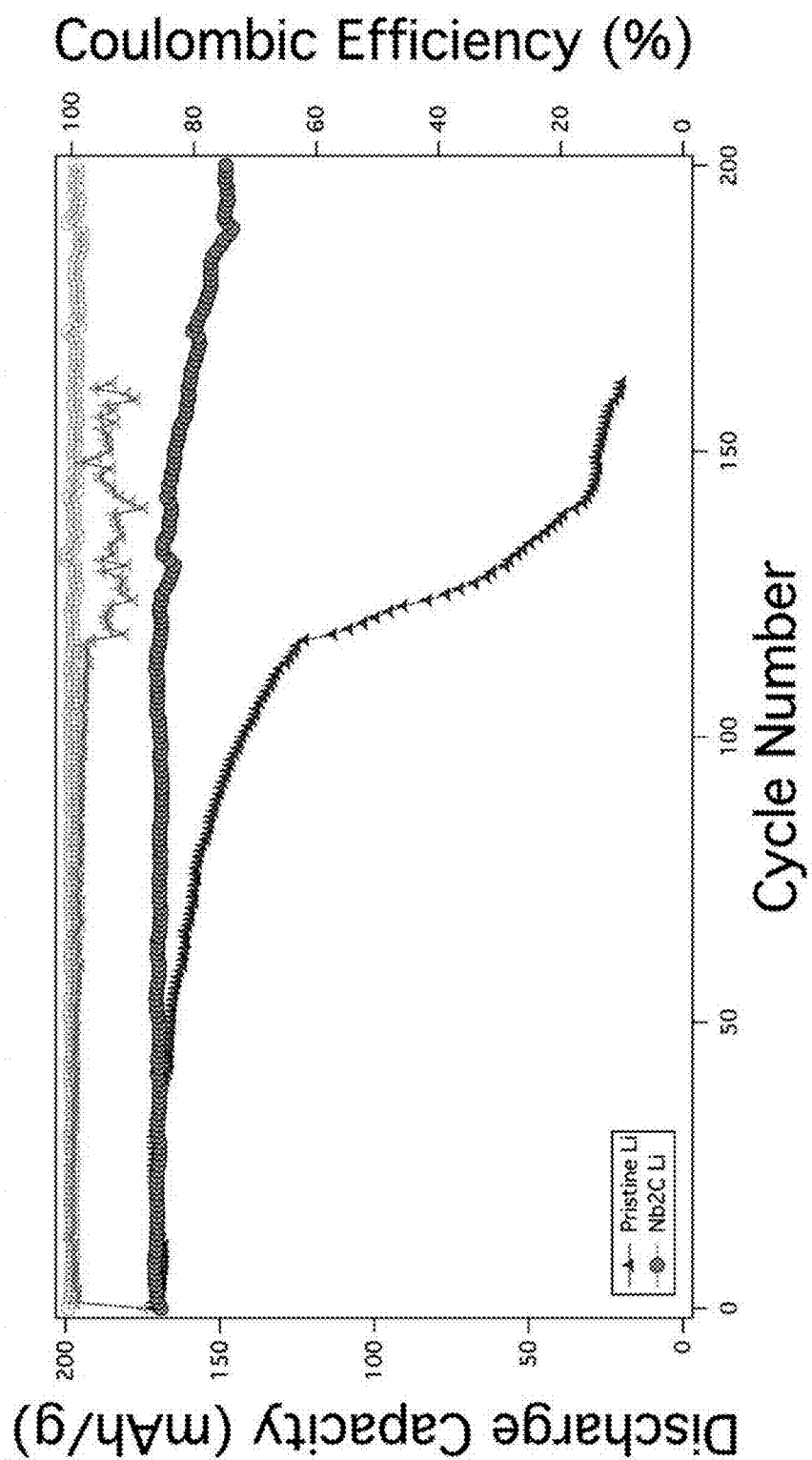
FIG. 9A shows cycle characteristics and charge/discharge efficiencies of a lithium metal secondary battery using a pristine lithium metal electrode ("Pristine Li" of Comparative Example 1) as an anode and a lithium metal electrode on which a Nb$_2$C thin film was formed ("Nb$_2$C Li" of Example 1-1) as an anode.
Figure 9B:
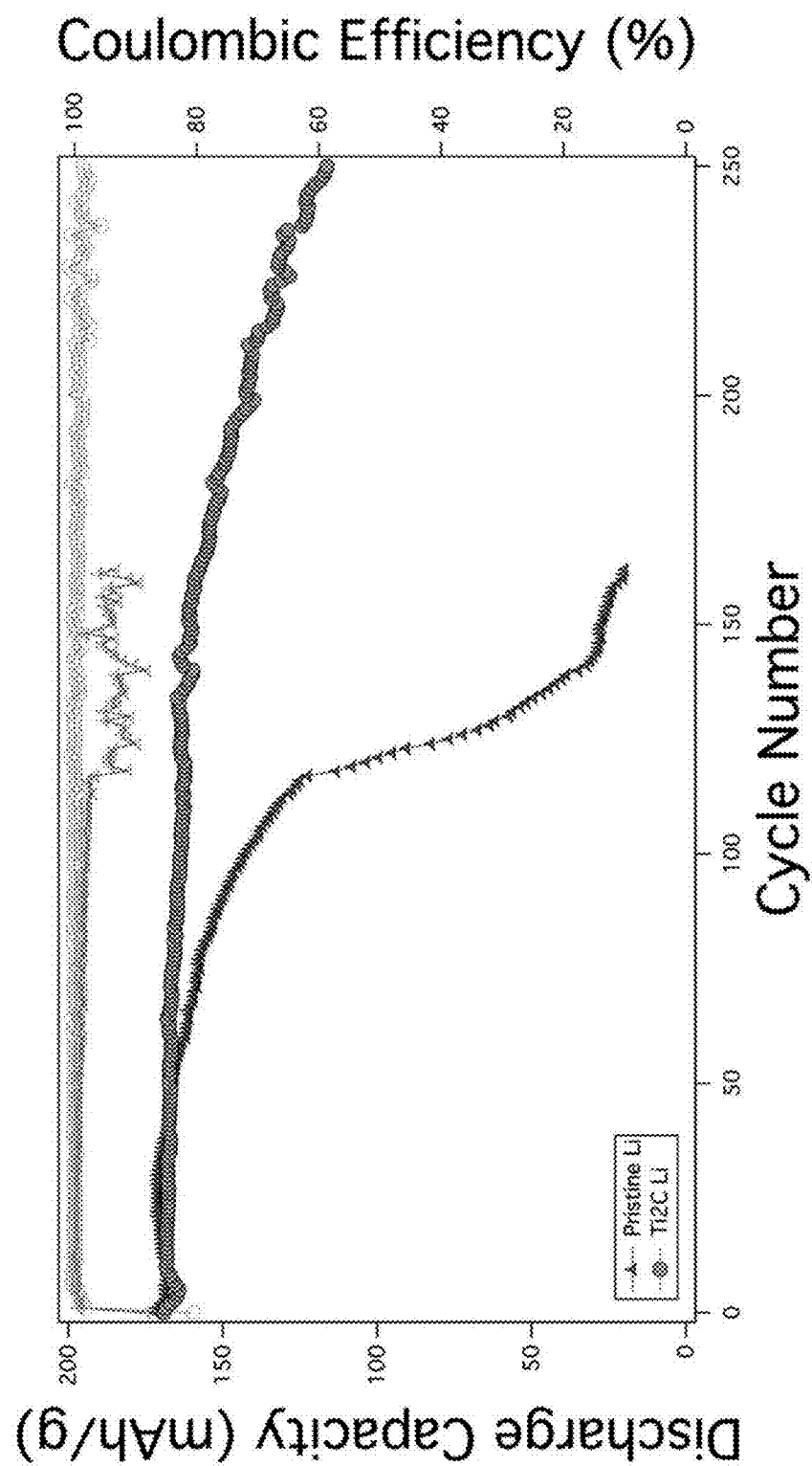
FIG. 9B shows cycle characteristics and charge/discharge efficiencies of a lithium metal secondary battery using a pristine lithium metal electrode ("Pristine Li" of Comparative Example 1) as an anode and a lithium metal electrode on which a Nb$_2$C thin film was formed ("Ti$_2$C Li" of Example 1-2) as an anode.
Figure 9C:
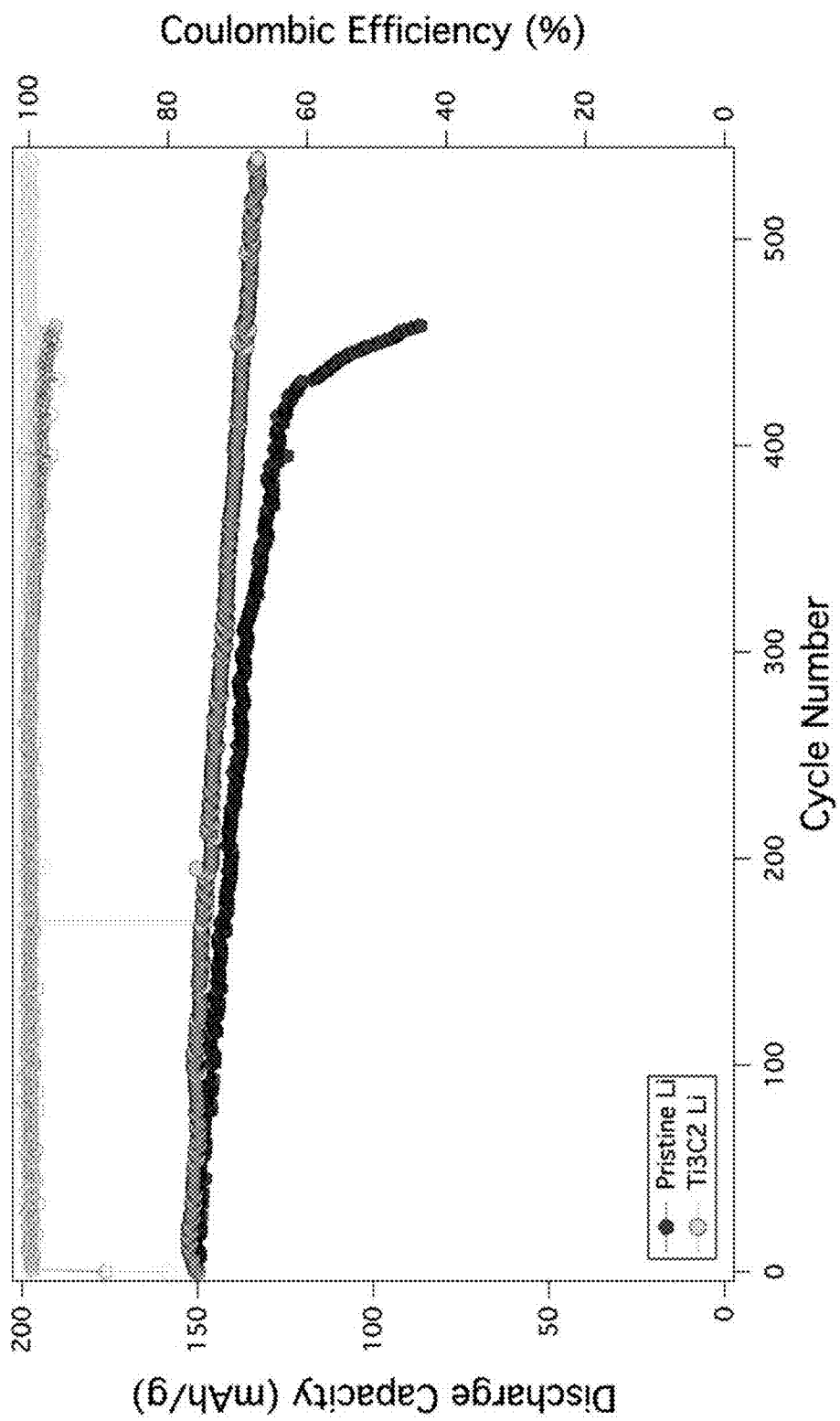
FIG. 9C shows cycle characteristics and charge/discharge efficiencies of a lithium metal secondary battery using a pristine lithium metal electrode ("Pristine Li" of Comparative Example 1) as an anode and a lithium metal electrode on which a Ti$_3$C$_2$ thin film was formed ("Ti$_3$C$_2$ Li" of Example 1-3) as an anode.

FIG. 9A shows cycle characteristics and charge/discharge efficiencies of a lithium metal secondary battery using the pristine lithium metal electrode ("Pristine Li" of Comparative Example 1) as an anode and a lithium metal secondary battery using the lithium metal electrode on which the Nb$_2$C thin film was formed ("Nb$_2$C Li" of Example 1-1) as an anode. FIG. 9B shows cycle characteristics and charge/discharge efficiencies of a lithium metal secondary battery using the pristine lithium metal electrode ("Pristine Li" of Comparative Example 1) as an anode and a lithium metal secondary battery using the lithium metal electrode on which the Nb$_2$C thin film was formed ("Ti$_2$C Li" of Example 1-2) as an anode. FIG. 9C shows cycle characteristics and charge/discharge efficiencies of a lithium metal secondary battery using the pristine lithium metal electrode ("Pristine Li" of Comparative Example 1) as an anode and a lithium metal secondary battery using the lithium metal electrode on which the Ti$_3$C$_2$ thin film was formed ("Ti$_3$C$_2$ Li" of Example 1-3) as an anode.

Each of the lithium metal secondary batteries was fabricated by the following procedure. First, a cathode plate was produced using LiNiCoMnO$_2$ (NCM) [8/1/1] as a three-component system. To this end, the synthesized sample (92%), a conductive material (4%), and a binder (4%) composed of polyvinylpyrrolidone (Mw~360,000) (2%), polyethylene oxide (Mw~1,000,000) (1%), and sodium carboxymethyl cellulose (Mw~250,000) (1%) were mixed in water to prepare a slurry. The slurry was coated on an aluminum foil using a doctor blade, dried in an oven at 80° C. for 1 day, and cut into a circular disc, which was used as a cathode. Pristine Li, Nb$_2$C Li, Ti$_2$C Li or Ti$_3$C$_2$ Li was used as an anode and Celgard 2500 was used as a separator. 0.6 M LiTFSI, 0.4 M LiF, 0.4 M LiBOB, and 0.05 M LiPF$_6$ were added to a solution of EC and DMC (4:6 wt %) and 1 wt % of FEC and 2 wt % of VC were added thereto to prepare an electrolyte. The cathode active material NCM was loaded at a concentration of 18 mg/cm$^2$. The cathode, anode, separator, and electrolyte were assembled into a 2032 coin cell. The battery was subjected to a charge/discharge test at 1C using a Maccor battery tester.

Referring to FIG. 9A, a cycle life of only 100 cycles was achieved for the battery using the pristine lithium metal electrode whereas a cycle life of at least 200 cycles was achieved for the battery using the lithium metal electrode on which the Nb$_2$C thin film was formed.

Referring to FIG. 9B, a cycle life of only 100 cycles was achieved for the battery using the pristine lithium metal electrode whereas a cycle life of at least 200 cycles was achieved for the battery using the lithium metal electrode on which the Ti$_2$C thin film was formed.

Referring to FIG. 9C, a cycle life of only 400 cycles was achieved for the battery using the pristine lithium metal electrode whereas a cycle life of at least 530 cycles was achieved for the battery using the lithium metal electrode on which the Ti$_3$C$_2$ thin film was formed.

Figure 10:
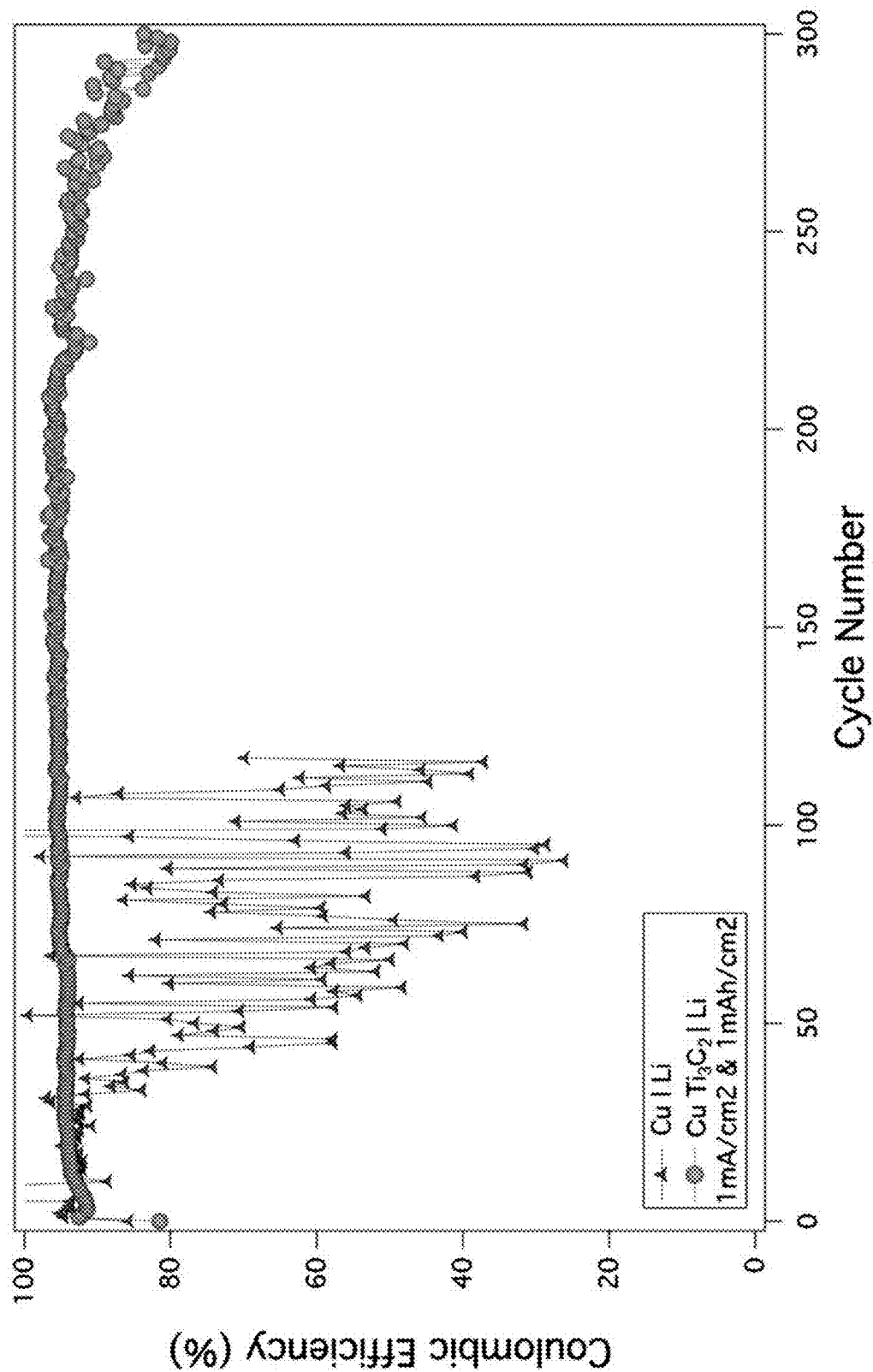
FIG. 10 shows coulombic efficiencies of lithium deposition/dissolution reactions in a lithium metal secondary battery using a copper foil coated with Ti$_3$C$_2$ prepared in Preparative Example 1-3 as a cathode and a lithium foil as an anode when charged/discharged at a current density of 1 mA/cm$^2$ and with a capacity of 1 mAh/cm$^2$.

FIG. 10 shows coulombic efficiencies of lithium deposition/dissolution reactions in a lithium metal secondary battery using a copper foil coated with the Ti$_3$C$_2$ prepared in Preparative Example 1-3 as a cathode and a lithium foil as an anode when charged/discharged at a current density of 1 mA/cm$^2$ and with a capacity of 1 mAh/cm$^2$.

Referring to FIG. 10, the coulombic efficiency of the battery using the copper electrode without Ti$_3$C$_2$ was drastically reduced after 30 charge/discharge cycles, whereas that of the battery using the $Ti_3C_2$-coated copper electrode was maintained at ≥90% even after 250 charge/discharge cycles.

In conclusion, the formation of the Mxene thin film on the lithium metal electrode in the anode of the present invention enables rapid diffusion and stable deposition of lithium ions to inhibit the formation of dendrites. In addition, the presence of the Mxene thin film prevents side reactions between the lithium metal electrode and the electrolyte in the lithium metal secondary battery of the present invention, achieving good stability and high coulombic efficiency of the lithium metal secondary battery.

What is claimed is:

1. A method for producing an anode for a lithium metal secondary battery, comprising:
   coating a thin film comprised of $Nb_2C$, $Ti_2C$ or $Ti_3C_2$ on a substrate;
   providing a lithium metal electrode; and
   laminating the thin film to a surface of the lithium metal electrode.

2. The method according to claim 1, wherein coating is accomplished by providing a dispersion of a powder comprising $Nb_2C$, $Ti_2C$ or $Ti_3C_2$; and coating the dispersion on the substrate by Langmuir-Blodgett scooping (LBS).

3. The method according to claim 2, further comprising, prior to providing the dispersion, obtaining the powder by etching a MAX phase structure represented by Formula 1, Formula 2 or Formula 3 below:

$$Nb_2AC \quad (1);$$

$$Ti_2AC \quad (2); \text{ and}$$

$$Ti_3AC_2 \quad (3),$$

where A is a metal selected from the group consisting of Group IIIA elements, Group IVA elements, Cd, and combinations thereof.

4. The method according to claim 3, wherein the MAX phase structure represented by Formula 1 is $Nb_2AlC$ and the etching is performed by mixing the $Nb_2AlC$ with hydrofluoric acid to provide a mixture in amounts so that a weight ratio of the $Nb_2AlC$ to hydrogen fluoride ranges from 1:3.5 to 1:6.0 and allowing the mixture to react for from 2 to 9 days.

5. The method according to claim 3, wherein the MAX phase structure represented by Formula 2 is $Ti_2AlC$ and the etching is performed by mixing the $Ti_2AlC$ with hydrofluoric acid to provide a mixture in amounts so that a weight ratio of the $Ti_2AlC$ to hydrogen fluoride ranges from 1:0.5 to 1:1.5 and allowing the mixture to react for from 12 to 36 hours.

6. The method according to claim 3, wherein the MAX phase structure represented by Formula 3 is $Ti_3AlC_2$ and the etching is performed by mixing the $Ti_3AlC_2$ with hydrofluoric acid to provide a mixture in amounts so that a weight ratio of the $Ti_3AlC_2$ to hydrogen fluoride ranges from 1:3.5 to 1:6.0 and allowing the mixture to react for 2-5 days.

7. The method according to claim 1, wherein laminating the thin film is accomplished by rolling.

8. The method according to claim 7, wherein laminating the thin film by rolling is accomplished by pressing the lithium metal against the thin film to provide a sandwich structure and passing the sandwich structure through a rolling mill.

9. The method according to claim 1, further comprising, after laminating the thin film, removing the substrate from the thin film.

10. The method according to claim 1, wherein laminating takes place in an inert atmosphere comprised of inert gasses.

11. The method according to claim 1, wherein laminating takes place in a dry atmosphere having a relative humidity ranging from 0% to 1%.

* * * * *